US011669988B1

(12) United States Patent
Miller et al.

(10) Patent No.: US 11,669,988 B1
(45) Date of Patent: Jun. 6, 2023

(54) SYSTEM AND METHOD FOR THREE-DIMENSIONAL BOX SEGMENTATION AND MEASUREMENT

(71) Applicant: 4DMobile, LLC, Hiawatha, IA (US)

(72) Inventors: Matthew D. Miller, Cedar Rapids, IA (US); Josh Berry, Cedar Rapids, IA (US); Mark Boyer, Cedar Rapids, IA (US)

(73) Assignee: 4DMOBILE, LLC, Hiawatha, IA (US)

( * ) Notice: Subject to any disclaimer, the term of this patent is extended or adjusted under 35 U.S.C. 154(b) by 352 days.

(21) Appl. No.: 17/114,066

(22) Filed: Dec. 7, 2020

Related U.S. Application Data

(63) Continuation-in-part of application No. 16/786,268, filed on Feb. 10, 2020, now abandoned.

(60) Provisional application No. 63/113,658, filed on Nov. 13, 2020.

(51) Int. Cl.
| | | |
|---|---|---|
| *G06T 7/62* | (2017.01) | |
| *G06T 7/593* | (2017.01) | |
| *G06T 7/12* | (2017.01) | |
| *G01B 11/24* | (2006.01) | |
| *G06T 7/11* | (2017.01) | |
| *H04N 13/204* | (2018.01) | |

(52) U.S. Cl.
CPC ............... *G06T 7/62* (2017.01); *G01B 11/24* (2013.01); *G06T 7/11* (2017.01); *G06T 7/12* (2017.01); *G06T 7/593* (2017.01); *G06T 2207/10021* (2013.01); *G06T 2207/10028* (2013.01); *H04N 13/204* (2018.05)

(58) Field of Classification Search
CPC ..... G06T 7/62; G06T 7/12; G06T 7/11; G06T 7/593; G06T 2207/10021; G06T 2207/10028; G01B 11/24; H04N 13/204
See application file for complete search history.

(56) References Cited

U.S. PATENT DOCUMENTS

| | | |
|---|---|---|
| 5,117,098 A | 5/1992 | Swartz |
| 5,329,106 A | 7/1994 | Hone et al. |
| 6,947,571 B1 | 9/2005 | Rhoads et al. |
| 8,239,229 B1 | 8/2012 | Paiz |
| 8,755,837 B2 | 6/2014 | Rhoads et al. |
| 8,775,710 B1 | 7/2014 | Miller et al. |
| 9,332,243 B2 | 5/2016 | Klusza et al. |
| 9,344,612 B2 | 5/2016 | Ritchey et al. |
| 9,464,885 B2 | 10/2016 | Lloyd et al. |
| 10,008,005 B2 * | 6/2018 | Lai .................... G01B 11/2545 |

(Continued)

OTHER PUBLICATIONS

Advanced Holography—Metrology and Imaging; Apr. 2011; (Year 2011).

(Continued)

*Primary Examiner* — Gregory M Desire
(74) *Attorney, Agent, or Firm* — Suiter Swantz pc llo

(57) ABSTRACT

A mobile device is capable of being carried by a user and directed at a target object. The mobile device may implement a system to dimension the target object. The system, by way of the mobile device, may image the target object to and receive a 3D image stream, including one or more frames. Each frame may include a plurality of points, where each point has an associated depth value. Based on the depth value of the plurality of points, the system, by way of the mobile device, may determine one or more dimensions of the target object.

20 Claims, 29 Drawing Sheets

(56) References Cited

U.S. PATENT DOCUMENTS

| | | | |
|---|---|---|---|
| 10,268,892 B1 | 4/2019 | Miller et al. | |
| 10,290,115 B2 * | 5/2019 | Baumgartner | G01B 11/245 |
| 10,366,276 B2 * | 7/2019 | Levinshtein | G06F 18/22 |
| 10,448,000 B2 | 10/2019 | Klusza et al. | |
| 10,559,086 B1 | 2/2020 | Miller et al. | |
| 10,699,421 B1 * | 6/2020 | Cherevatsky | G06V 20/52 |
| 10,994,419 B2 * | 5/2021 | Kikkeri | G06T 7/20 |
| 2002/0014533 A1 | 2/2002 | Zhu et al. | |
| 2004/0023444 A1 | 2/2004 | Takano | |
| 2004/0190092 A1 | 9/2004 | Silverbrook et al. | |
| 2009/0267895 A1 | 10/2009 | Bunch | |
| 2012/0268606 A1 | 10/2012 | Liu | |
| 2013/0016070 A1 | 1/2013 | Starner et al. | |
| 2013/0083173 A1 | 4/2013 | Geisner et al. | |
| 2013/0273968 A1 | 10/2013 | Rhoads et al. | |
| 2014/0225985 A1 | 8/2014 | Klusza et al. | |
| 2014/0306993 A1 | 10/2014 | Poulos et al. | |
| 2014/0333666 A1 | 11/2014 | Poulos et al. | |

OTHER PUBLICATIONS

Hu, Han et al., "Toward Scalable Systems for Big Data Analytics: A Technology Tutorial", IEEE Access, vol. 2, Published Jun. 24, 2014, Digital Object Identifier 10.1109/Access 2014.2332453, pp. 652-687.
Ntemet NPL search log (Year: 2019).
NPL Google Search; 2020; (Year: 2020).
The Art of Game Design; Schell et al.; Apr. 2015; (Year: 2015).
Theory and applications of marker based AR; Siltanen et al., 2012; (Year: 2012).
Three-dimensional imaging from a unidirectional hologram; Okoshi, 1976; (Year: 1976).
Toward scalable System for Big data analytics; Hu et al.; Apr. 2014 (Year: 2014).

* cited by examiner

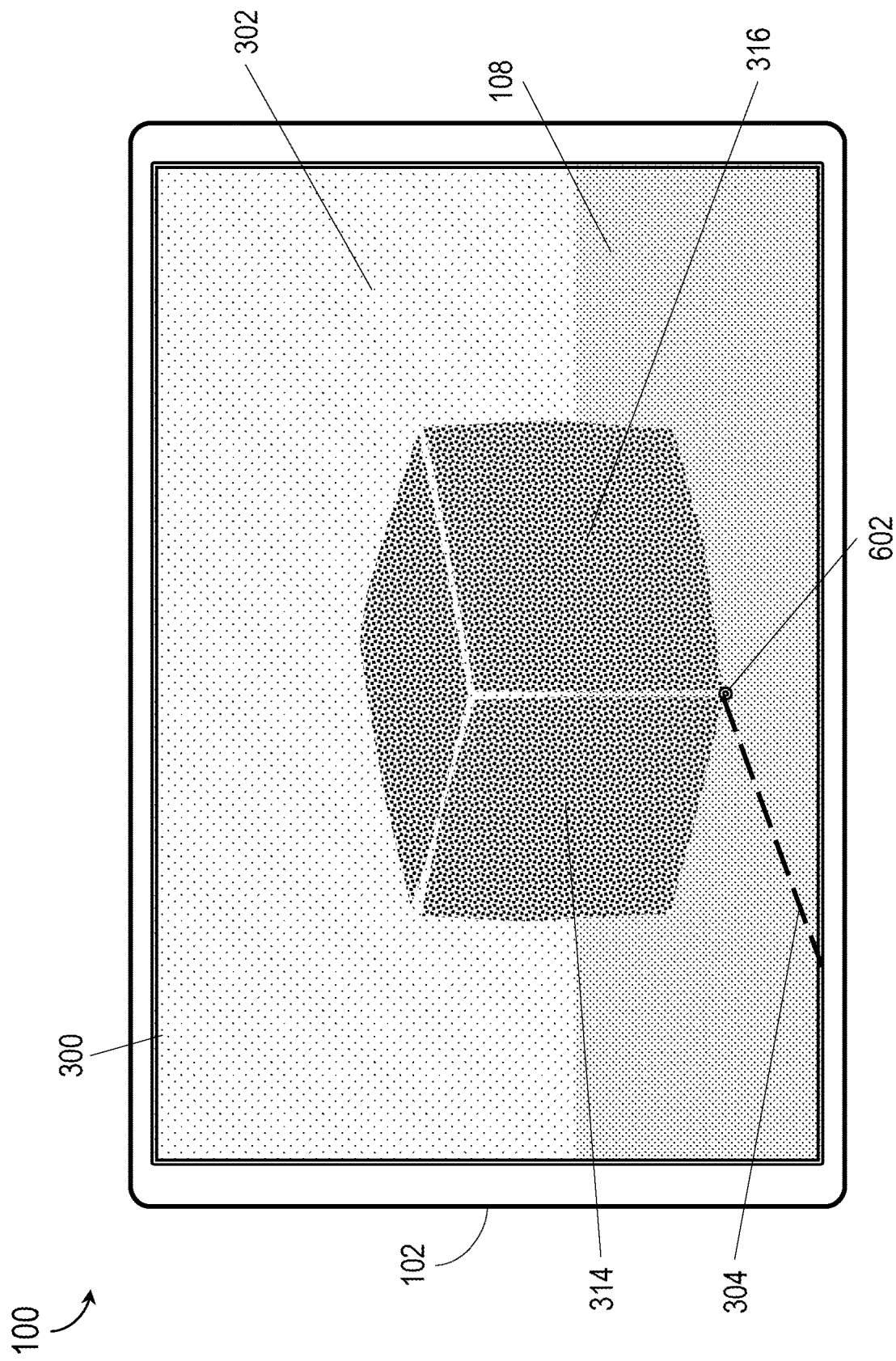

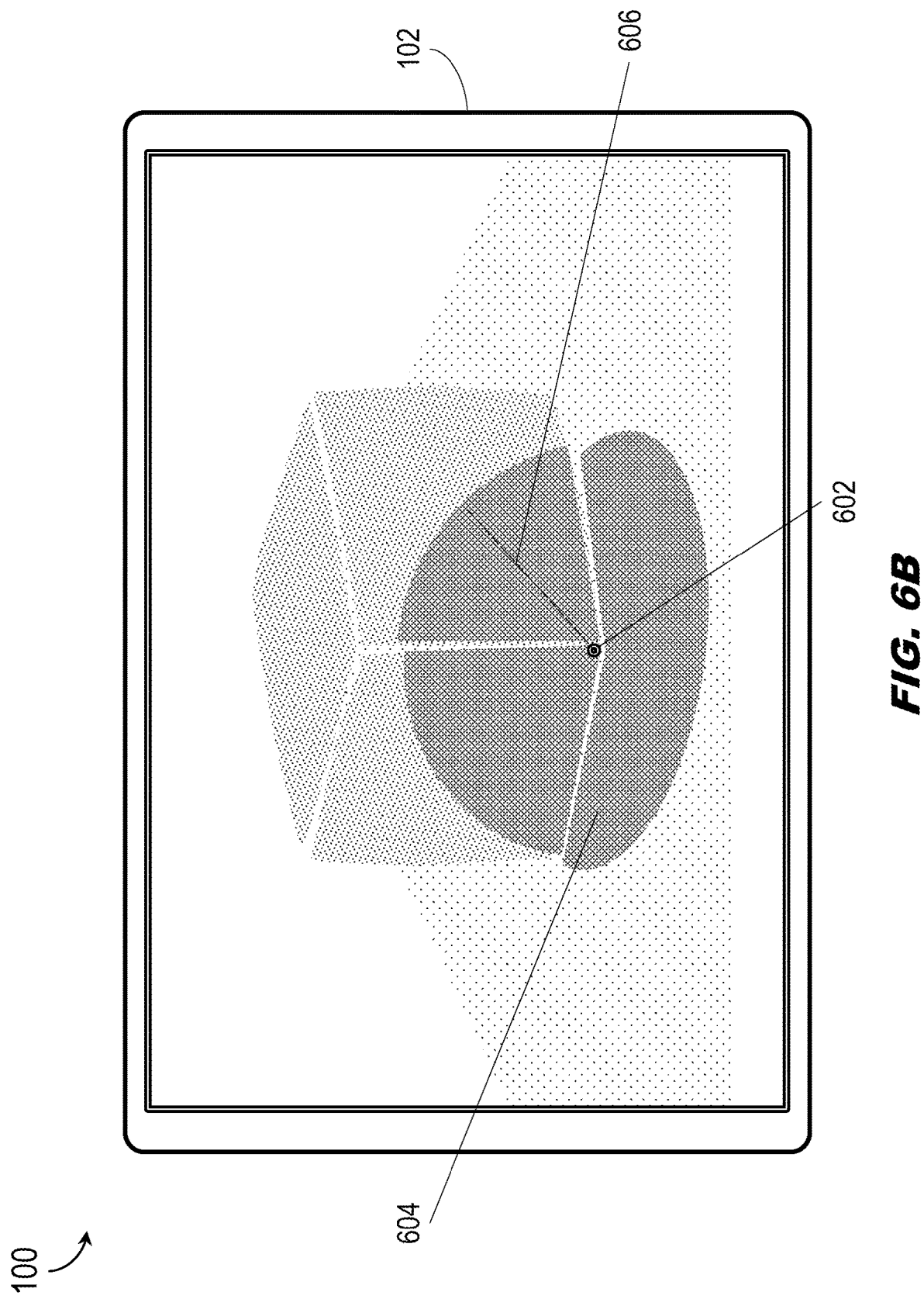

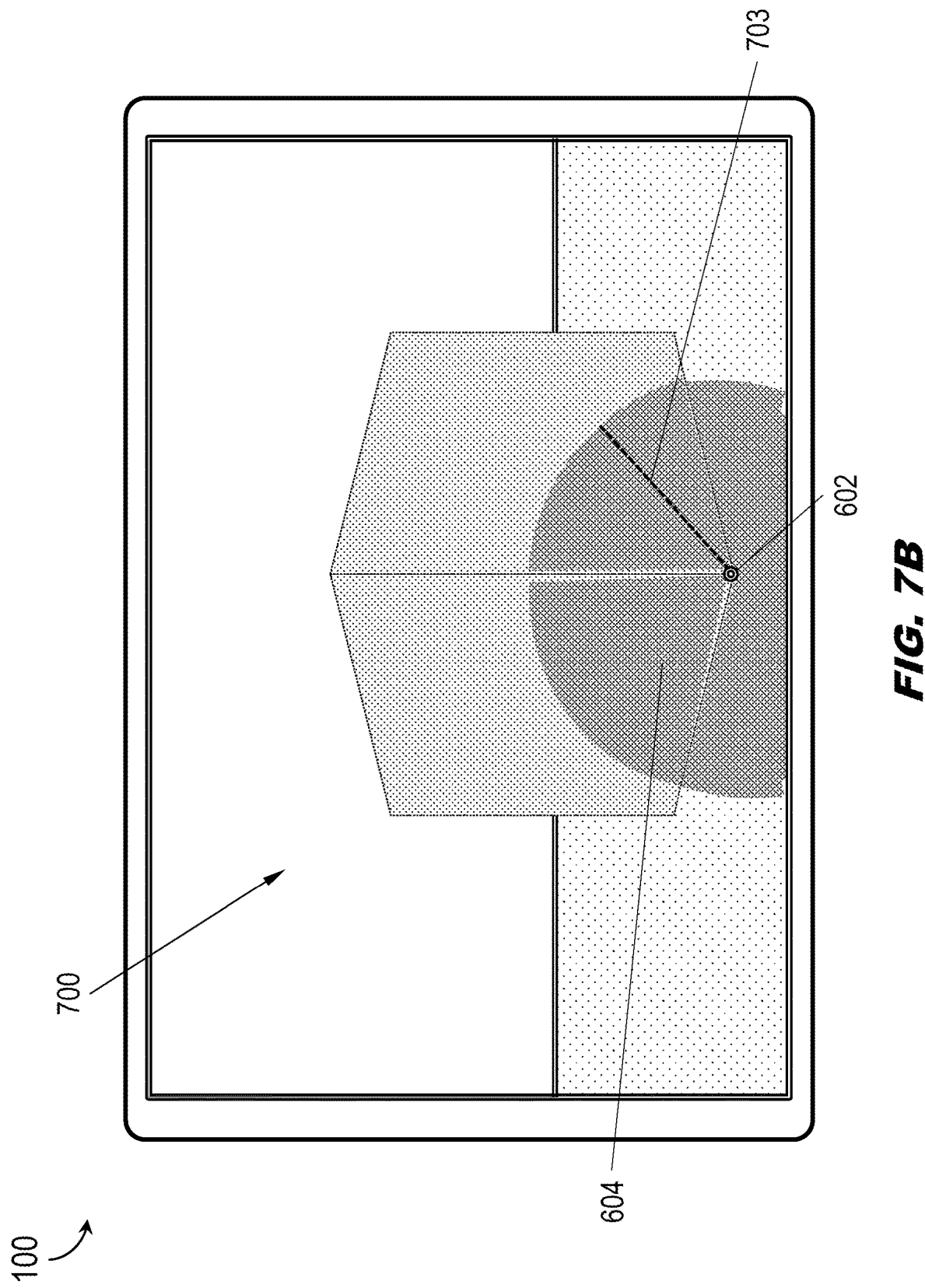

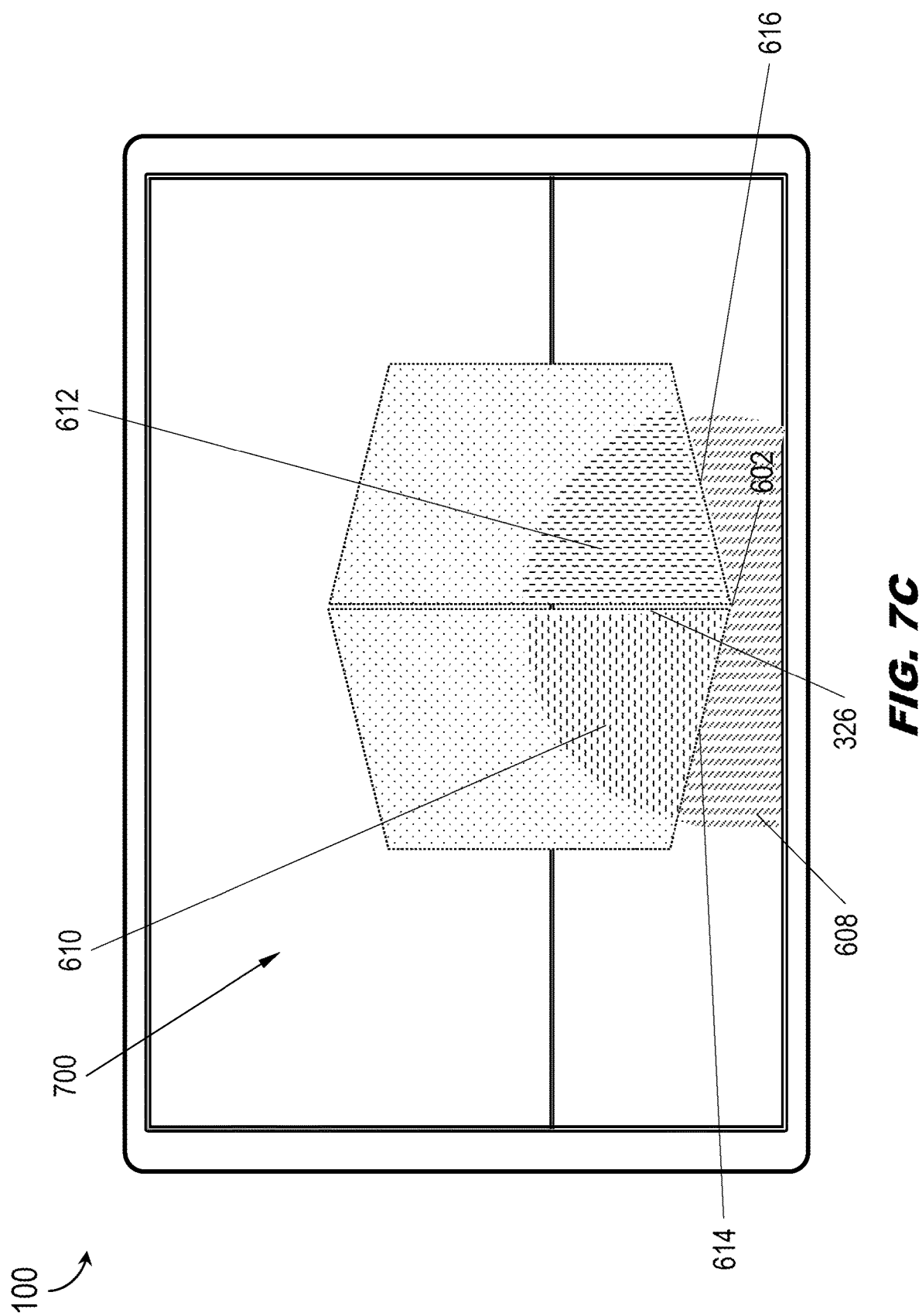

SYSTEM AND METHOD FOR THREE-DIMENSIONAL BOX SEGMENTATION AND MEASUREMENT

CROSS-REFERENCE TO RELATED APPLICATION

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims the benefit under 35 USC § 119(e) for provisional applications, for any and all parent, grandparent, great-grandparent, etc. applications of the Related Applications).

RELATED APPLICATIONS

U.S. patent application Ser. No. 16/786,268 entitled SYSTEM FOR VOLUME DIMENSIONING VIA HOLOGRAPHIC SENSOR FUSION, filed Feb. 10, 2020.

U.S. patent application Ser. No. 16/390,562 entitled SYSTEM FOR VOLUME DIMENSIONING VIA HOLOGRAPHIC SENSOR FUSION, filed Apr. 22, 2019, which issued Feb. 11, 2020 as U.S. Pat. No. 10,559,086;

U.S. patent application Ser. No. 15/156,149 entitled SYSTEM AND METHODS FOR VOLUME DIMENSIONING FOR SUPPLY CHAINS AND SHELF SETS, filed May 16, 2016, which issued Apr. 23, 2019 as U.S. Pat. No. 10,268,892;

U.S. Provisional Patent Application Ser. No. 63/113,658 entitled SYSTEM AND METHOD FOR THREE-DIMENSIONAL BOX SEGMENTATION AND MEASUREMENT, filed Nov. 13, 2020;

U.S. Provisional Patent Application Ser. No. 62/694,764 entitled SYSTEM FOR VOLUME DIMENSIONING VIA 2D/3D SENSOR FUSION, filed Jul. 6, 2018;

and U.S. Provisional Patent Application Ser. No. 62/162,480 entitled SYSTEMS AND METHODS FOR COMPREHENSIVE SUPPLY CHAIN MANAGEMENT VIA MOBILE DEVICE, filed May 15, 2015.

Said U.S. patent application Ser. Nos. 16/786,268; 16/390,562; 15/156,149; 63/113,658; 62/162,480; and 62/694,764 are herein incorporated by reference in their entirety.

BACKGROUND

While many smartphones, pads, tablets, and other mobile computing devices are equipped with front-facing or rear-facing cameras, these devices may now be equipped with three-dimensional imaging systems incorporating cameras configured to detect infrared radiation combined with infrared or laser illuminators (e.g., light detection and ranging (LIDAR) systems) to enable the camera to derive depth information. It may be desirable for a mobile device to capture three-dimensional (3D) images of objects, or two-dimensional (2D) images with depth information, and derive from the captured imagery additional information about the objects portrayed, such as the dimensions of the objects or other details otherwise accessible through visual comprehension, such as significant markings, encoded information, or visible damage.

However, elegant sensor fusion of 2D and 3D imagery may not always be possible. For example, 3D point clouds may not always map optimally to 2D imagery due to inconsistencies in the image streams; sunlight may interfere with infrared imaging systems, or target surfaces may be highly reflective, confounding accurate 2D imagery of planes or edges.

SUMMARY

A mobile computing device capable of being held by a user is disclosed. The mobile computing device includes a three-dimensional (3D) imager. The 3D imager is configured to capture at least 3D imaging data associated with a target object positioned on a background surface. The 3D imaging data includes a sequence of frames, where each frame is associated with a plurality of points, where each point has an associated depth value. The mobile computing device may include one or more processors in communication with the 3D imager. The one or more processors may be configured to identify within the plurality of points, based on the depth values, at least one origin point, at least one subset of neighboring points, a plurality of plane segments, a plurality of edge segments, one or more edge distances associated with the edge segments, and one or more dimensions of the target object.

A method for dimensioning an object is disclosed. The method includes obtaining a point cloud of a target object, the point cloud including a plurality of points. The method further includes determining an origin point of the target object from within the plurality of points. The method further includes determining at least three plane segments of the target object by an iterative loop. The iterative loop includes acquiring a point segmentation by identifying a first subset of the plurality of points within a radius of the origin point. The iterative loop further includes determining at least three plane segments associated with the point segmentation. The iterative loop further includes determining at least three edges of the target object, each edge based on an intersection of two of the at least three plane segments. The iterative loop further includes updating the origin point based on an intersection of the at least three edges. The method further includes measuring the at least three edge distances from the origin point along the at least three edges to determine a second subset of points, each point of the second subset of points having a depth value indicative of the target object. The method further includes determining one or more edge distances by traversing each of the at least three edge segments over at least one interval. The method further includes determining, via the mobile computing device, at least one dimension corresponding to an edge of the target object based on the one or more edge distances.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 6A through 6C are diagrammatic illustrations of the mobile device of the volume dimensioning system of FIG. 1;

FIGS. 7A through 7E are diagrammatic illustrations of the mobile device of the volume dimensioning system of FIG. 1;

DETAILED DESCRIPTION

Figure 1:
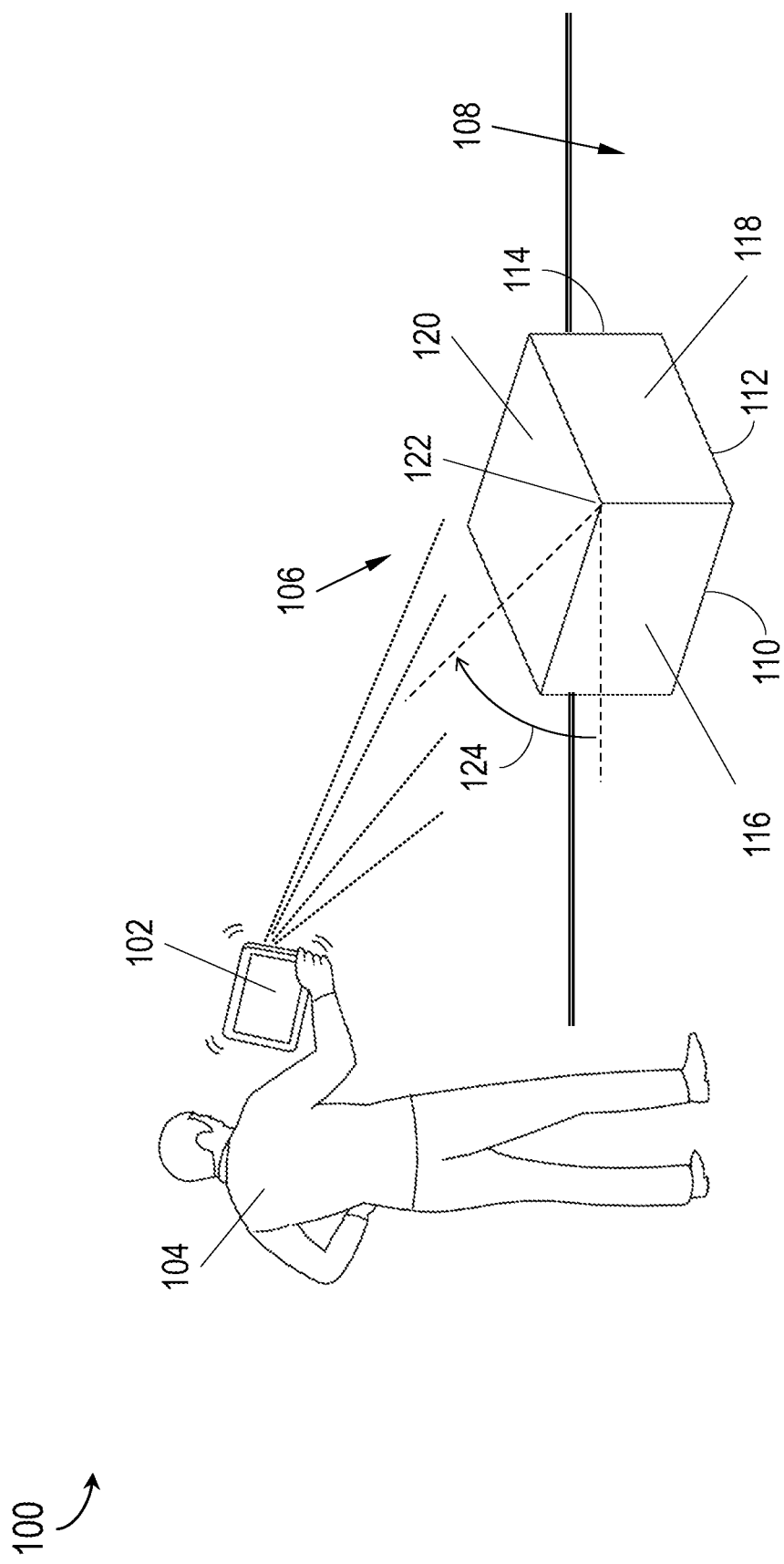
FIG. 1 is a diagrammatic illustration a volume dimensioning system including a user aiming a mobile device at a target object, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system for segmentation and dimensional measurement of a target object based on three-dimensional (3D) imaging is disclosed. In embodiments, the segmentation and measurement system comprises 3D image sensors incorporated into or attached to a mobile computing device e.g., a smartphone, tablet, phablet, or like portable processor-enabled device. The segmentation captures 3D imaging data of a rectangular cuboid solid (e.g., "box") or like target object positioned in front of the mobile device and identifies planes, edges and corners of the target object, measuring precise dimensions (e.g., length, width, depth) of the object.

Referring to FIG. 1, a system 100 for 3D box segmentation and measurement is disclosed. The system 100 may include a mobile device 102 (e.g., tablet, smartphone, phablet) capable of being carried by a user 104 (e.g., operator) and aimed at a target object 106 (e.g., a rectangular cuboid solid ("target box") or like object the user wishes to measure in three dimensions, the object positioned on a floor or flat surface 108. For example, the system 100 may return dimensional information of the target object 106, e.g., a length 110, width 112, and depth 114 of the target object. In some embodiments, the system 100 will characterize the greatest of the length 110, width 112, and depth 114 as the length of the target object 106; in some embodiments, the system 100 may derive additional information corresponding to the target object 106 based on the determined length 110, width 112, and depth 114 (or as disclosed in greater detail below). In embodiments, the mobile device 102 may be optimally oriented to the target object 106 such that three mutually intersecting planes of the target object, e.g., a left-side plane 116, a right-side plane 118, and a top plane 120, are clearly visible, and such that the mobile device 102 is positioned nearest a top corner 122 of the target object (e.g., where the three planes 116, 118, 120 intersect) at an angle 124 (e.g., a 45-degree angle). For example, the system 100 may prompt the user 104 to reposition or reorient the mobile device 102 to achieve the optimal orientation described above.

Figure 2:
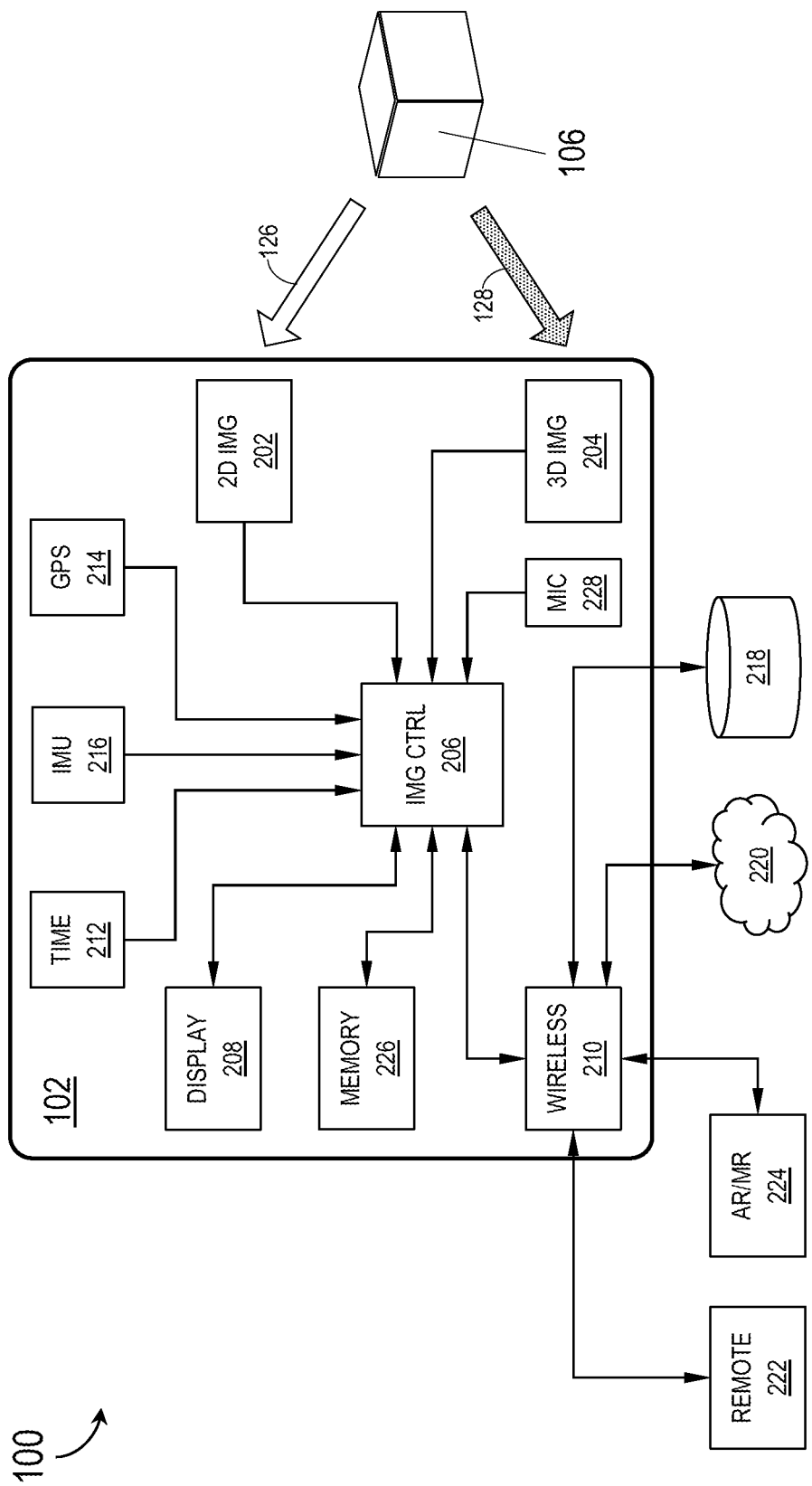
FIG. 2 is a block diagram illustrating the mobile device of the volume dimensioning system of FIG. 1.

Referring also to FIG. 2, the mobile device 102 may include 2D image sensors 202 (e.g., a visible-light camera), 3D image sensors 204 (e.g., a 3D imager), image and control processors 206, a touch-sensitive display surface 208, and a wireless transceiver 210. The mobile device 102 may additionally include a clock 212 or time sensor, a Global Positioning System (GPS) receiver 214 or similar position sensor for determining a current position of the mobile device, and an inertial measurement unit 216 (IMU) or similar inertial sensor (e.g., accelerometer, magnetometer, gyrometer, compass) for determining a current orientation of the mobile device (or for tracking the orientation, and the rate of change thereof, over time). Instead of, or in addition to, onboard IMUs 216 of the mobile device 102, the system 100 may incorporate IMUs integrated into the 2D image sensors 202 or into the 3D image sensors 204. The 3D image sensors 204 may include imaging systems including infrared illuminators combined with multiple embedded cameras (e.g., Intel RealSense or other like triangulating systems), laser-based light detection and ranging (LIDAR) systems incorporating onboard photodetectors to track reflected beams and return distance information of the target object 106, time of flight (ToF) camera systems, or any other like sensor system capable of producing 3D spatial information of proximate objects. As noted above, the 3D image sensors 204 may incorporate inertial or orientation sensors or combinations thereof, e.g., accelerometers, gyroscopes, and compasses. The 3D image sensors may include any suitable sensors for determining depth data of the target object, such as, but not limited to, distance sensors. For example, distance sensors may include sensors equipped to detect infrared radiation together with infrared or laser illuminators (e.g., light detection and ranging (LIDAR) systems.

In embodiments, the mobile device 102 may be oriented toward the target object 106 in such a way that the 3D image sensors 204 capture 3D imaging data from a field of view in which the target object 106 is situated. For example, the target object 106 may include a shipping box or container currently traveling through a supply chain, e.g., from a known origin to a known destination. The target object 106 may be freestanding on a floor, table, or other flat surface 108; in some embodiments the target object 106 may be secured to a pallet or similar structural foundation, either individually or in a group of such objects, for storage or transport (as disclosed below in greater detail). The target object 106 may be preferably substantially cuboid (e.g., cubical or rectangular cuboid) in shape, e.g., having six rectangular planar surfaces intersecting at right angles. In embodiments, the target object 106 may not itself be perfectly cuboid but may fit perfectly within a minimum cuboid volume of determinable dimensions (e.g., the minimum cuboid volume necessary to fully surround or encompass the target object) as disclosed in greater detail below.

In embodiments, the system 100 may detect the target object 106 via 3D imaging data captured by the 3D image sensors 204, e.g., a point cloud (see FIG. 3A, point cloud 300) comprising every point in the field of view of the 3D image sensors. For example, the point cloud 300 may correspond to an array of XY points (where XY corresponds to an imaging resolution, e.g., X vertical arrays of Y pixels each), each point within the point cloud having a depth value corresponding to a distance of the point (e.g., in millimeters) from the 3D image sensors 204 (or, e.g., a distance from the mobile device 102).

3D image data 128 may include a stream of pixel sets, each pixel set substantially corresponding to a frame of 2D image stream 126. Accordingly, the pixel set may include a point cloud 300 substantially corresponding to the target object 106. Each point of the point cloud 300 may include a coordinate set (e.g., XY) locating the point relative to the field of view (e.g., to the frame, to the pixel set) as well as plane angle and depth data of the point, e.g., the distance of the point from the mobile device 102.

The system 100 may analyze depth information about the target object 106 and its environment as shown within its field of view. For example, the system 100 may identify the floor (108, FIG. 1) as a plane of gradually increasing depth that meets an intersecting plane (e.g., left-side plane 116, a right-side plane 118, a top-side plane 120, FIG. 1) of the target object 106. Based on the intersections of the plane of the target object 106 (e.g., with each other or with the floor 108), the system 100 may identify candidate edges. Similarly, the intersection of three plane surfaces, or the intersection of two candidate edges, may indicate a candidate corner (e.g., vertex).

In embodiments, the wireless transceiver 210 may enable the establishment of wireless links to remote sources, e.g., physical servers 218 and cloud-based storage 220. For example, the wireless transceiver 210 may establish a wireless link 210*a* to a remote operator 222 situated at a physical distance from the mobile device 102 and the target object 106, such that the remote operator may visually interact with the target object 106 and submit control input to the mobile device 102. Similarly, the wireless transceiver 210 may establish a wireless link 210*a* to an augmented reality (AR) viewing device 224 (e.g., a virtual reality (VR) or mixed reality (MR) device worn on the head of a viewer, or proximate to the viewer's eyes, and capable of displaying to the viewer real-world objects and environments, synthetic objects and environments, or combinations thereof). For example, the AR viewing device 224 may allow the user 104 to interact with the target object 106 and/or the mobile device 102 (e.g., submitting control input to manipulate the field of view, or a representation of the target object situated therein) via physical, ocular, or aural control input detected by the AR viewing device.

In embodiments, the mobile device 102 may include a memory 226 or other like means of data storage accessible to the image and control processors 206, the memory capable of storing reference data accessible to the system 100 to make additional determinations with respect to the target object 106. For example, the memory 226 may store a knowledge base comprising reference boxes or objects to which the target object 106 may be compared, e.g., to calibrate the system 100. For example, the system 100 may identify the target object 106 as a specific reference box (e.g., based on encoded information detected on an exterior surface of the target object and decoded by the system) and calibrate the system by comparing the actual dimensions of the target object (e.g., as derived from 3D imaging data) with the known dimensions of the corresponding reference box, as described in greater detail below.

In embodiments, the mobile device 102 may include a microphone 228 for receiving aural control input from the user/operator, e.g., verbal commands to the volume dimensioning system 100.

Figure 3A:
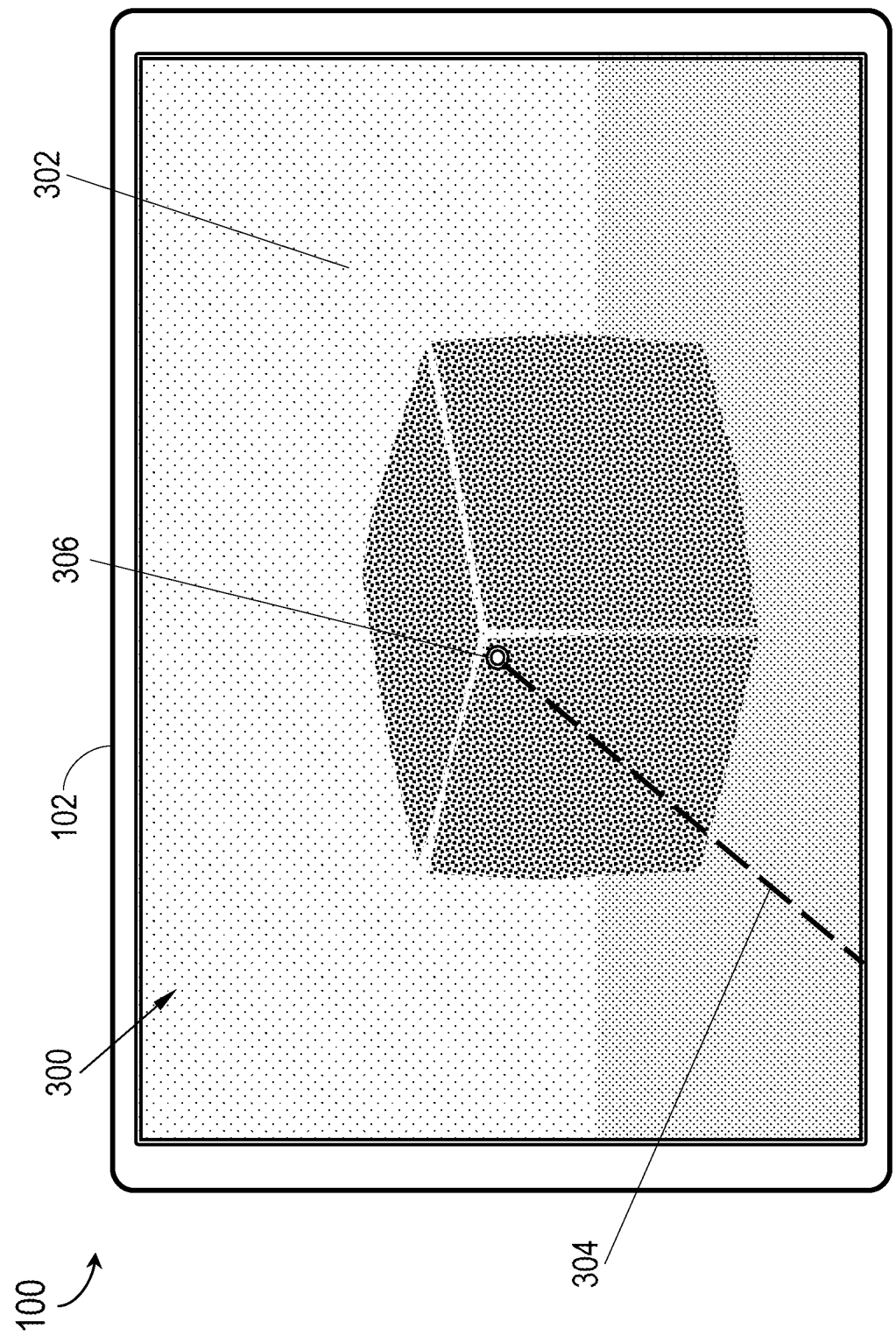
FIGS. 3A through 3I are diagrammatic illustrations of the mobile device of the volume dimensioning system of FIG. 1.

Referring to FIG. 3A, a point cloud 300 within the field of view of, and captured by, the mobile device 102, is disclosed.

In embodiments, the system 100 may determine the dimensions of the target object (106, FIG. 1) (e.g., length 110, width 112, depth 114; FIG. 1) by capturing and analyzing 3D imaging data of the target object via the 3D image sensors (204, FIG. 2) of the mobile device 102. For example, the 3D image sensors 204 may, for each frame captured, generate a point cloud including the target object 106 and its immediate environment (e.g., including the flat surface (108, FIG. 1) on which the target object is disposed and a wall 302 (or other background) in front of which the target object is disposed). The point cloud 300 may be generated based on a depth map (not depicted) captured by the 3D image sensors 204.

For example, the 3D image sensors 204 may ray cast (304) directly ahead of the image sensors to identify a corner point 306 closest to the image sensors (e.g., closest to the mobile device 102). In embodiments, the corner point 306 should be near the intersection of the left-side, right-side, and top planes (116, 118, 120; FIG. 1) and should, relative to the point cloud 300, have among the lowest depth values (representing a position closest to the 3D image sensors 204), corresponding to the top center corner (122, FIG. 1) of the target object 106. Any discrepancies between the identified corner point 306 and the actual top center corner 122 may be resolved as described below.

Figure 3B:
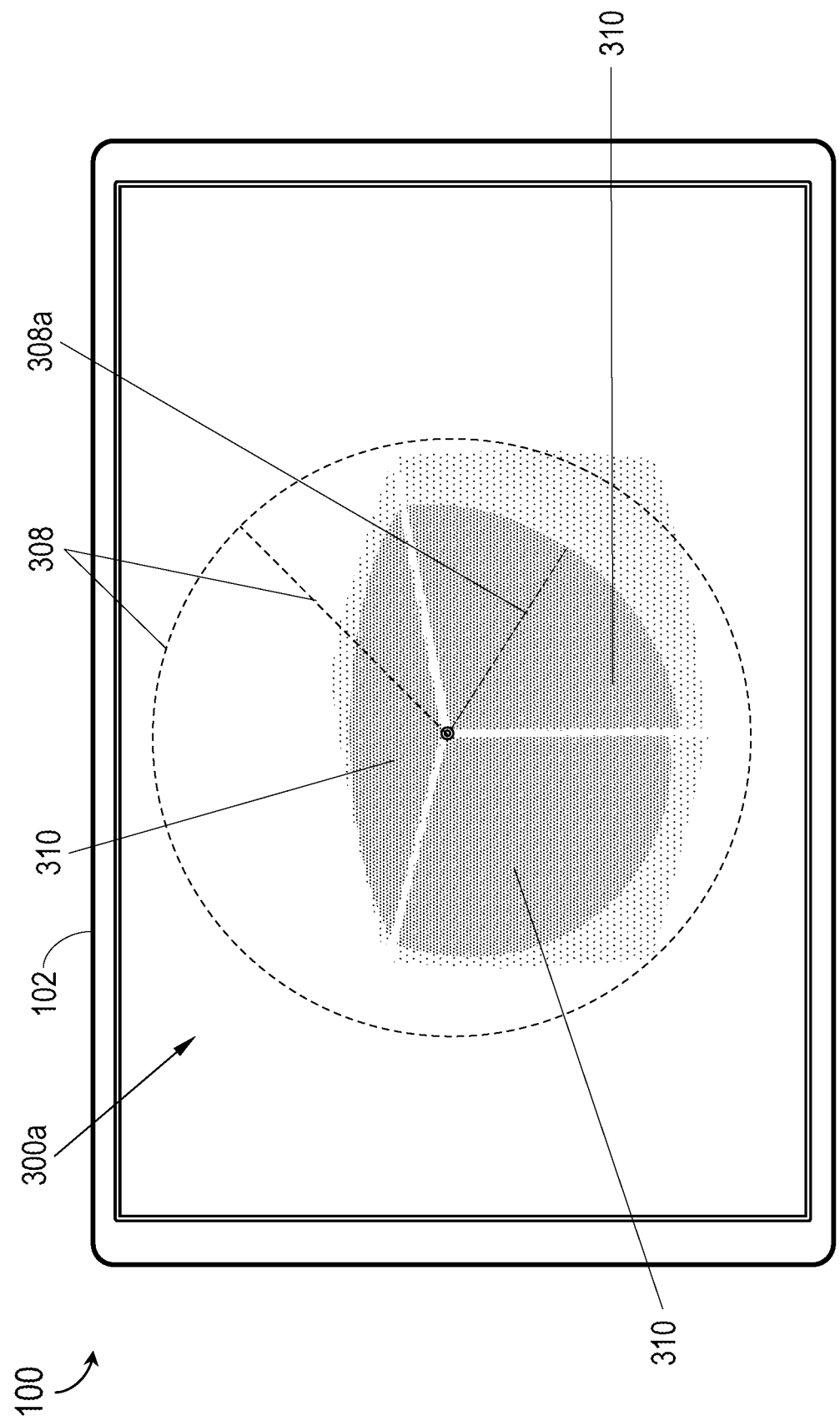

Referring also to FIG. 3B, the point cloud 300a may be implemented similarly to the point cloud 300 of FIG. 3A, except that the system 100 may identify points within the point cloud 300a corresponding to the target object (FIG. 1, 106).

In embodiments, the system 100 may perform radius searching within the point cloud 300a to segment all points within a predetermined radius 308 (e.g., distance threshold) of the corner point 306. For example, the predetermined radius 308 may be set according to, or may be adjusted (308a) based on, prior target objects dimensioned by the system 100 (or, e.g., based on reference boxes and objects stored to memory (FIG. 2, 226)). In embodiments, the system 100 may perform nearest-neighbors searches (e.g., k-NN) of the point cloud 300a to identify a set of neighboring points 310 likely corresponding to the target object 106.

Figure 3C:
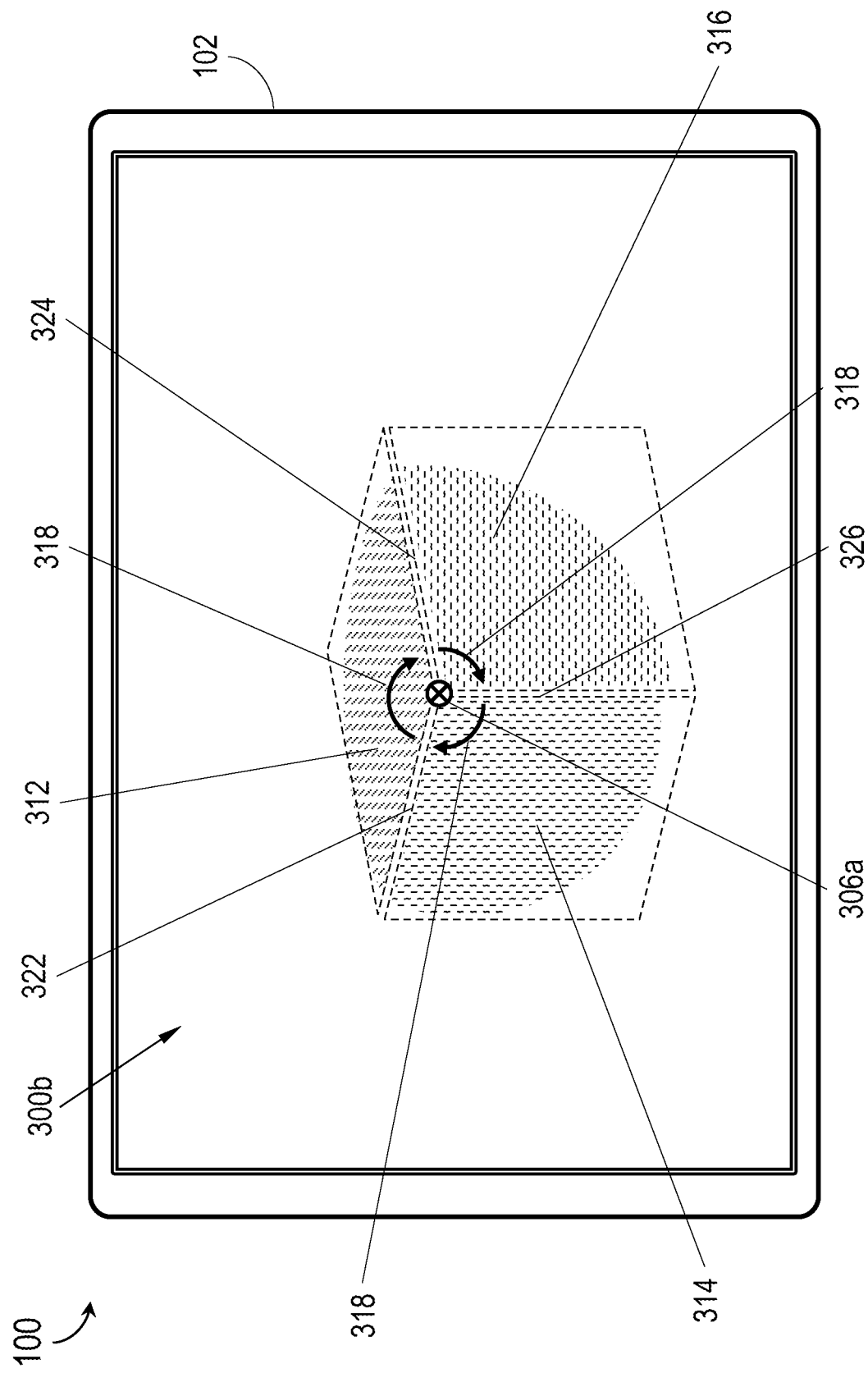

Referring also to FIG. 3C, the point cloud 300b may be implemented similarly to the point cloud 300a of FIG. 3B, except that the system 100 may perform within the point cloud 300b plane segmentation on the set of neighboring points (310, FIG. 3B) identified within the point cloud 300a.

In embodiments, the system 100 may algorithmically identify the three most prominent planes 312, 314, 316 from within the set of neighboring points 310 (e.g., via random sample consensus (RANSAC) and other like algorithms). For example, the prominent planes 312, 314, 316 may correspond to the left-side, right-side, and top planes (116, 118, 120; FIG. 1) of the target object (106, FIG. 1) (e.g., provided the target object 106 is in or near an optimal orientation to the mobile device (102, as best shown by FIG. 1) and may be fit to the left-side, right-side, and top planes 116, 118, 120.

In embodiments, the system 100 may further analyze the angles 318 at which the prominent planes 312, 314, 316 mutually intersect to ensure that the intersections correspond to right angles (e.g., 90°) and therefore to edges 322, 324, 326 of the target object 106. The system 100 may identify an intersection point (306a) where the prominent planes 312, 314, 316 mutually intersect, for example, the intersection point 306a should substantially correspond to the actual top center corner (122, FIG. 1) of the target object 106. Furthermore, the system 100 may identify edge segments (e.g., edge segment 326a, FIG. 3H) associated with an intersection of two adjacent planes of the prominent planes 312, 314, 316.

Figure 3D:
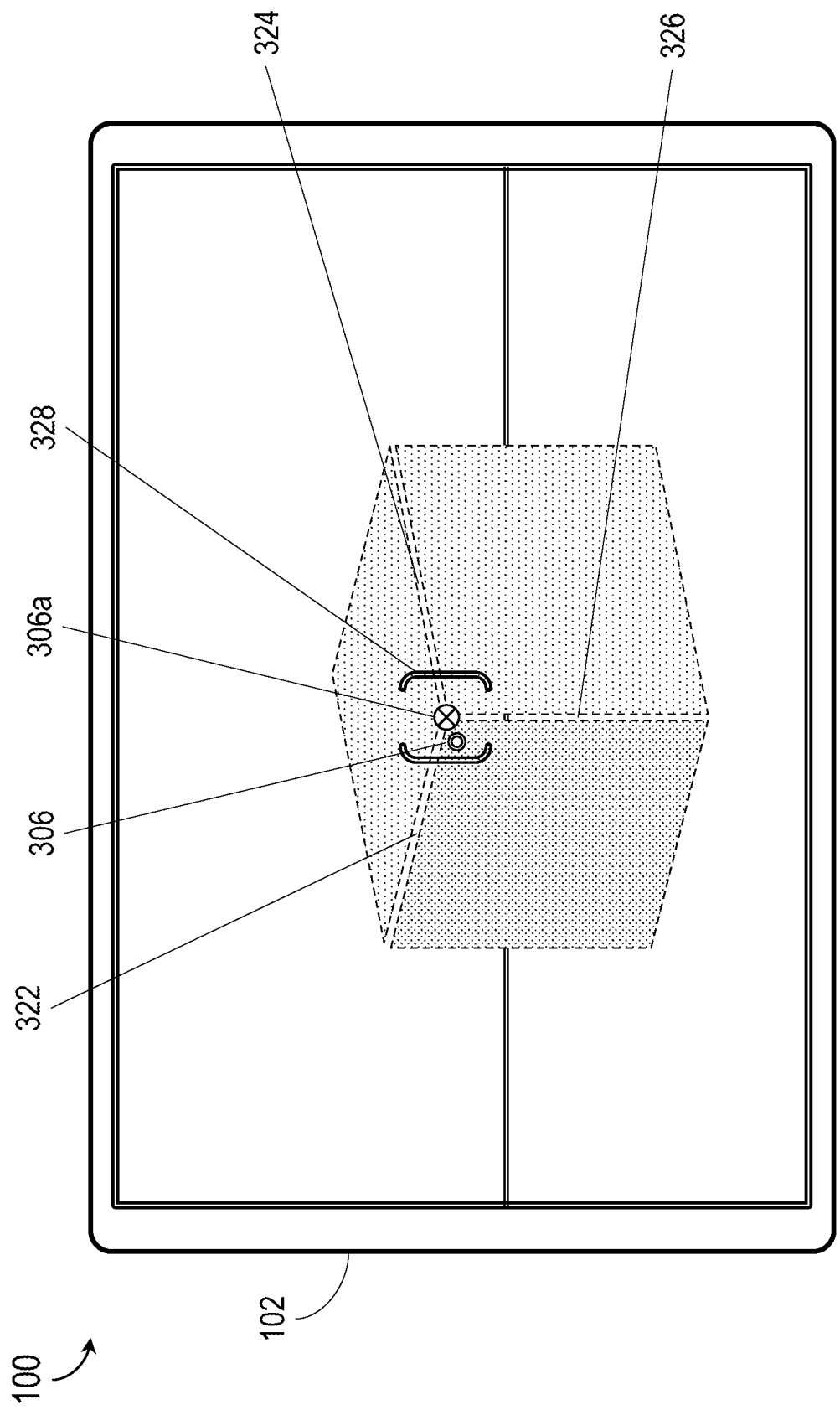

Referring also to FIG. 3D, the identified intersection point 306a may differ from the previously identified corner point 306. In embodiments, the system may repeat the radius searching and plane segmentation operations shown above by FIGS. 3B and 3C based on the identified intersection point 306a, e.g., to more accurately identify the left-side, right-side, and top planes 116, 118, 120 of the target object 106. Such refinement of radius searching and plane segmentation operations may be performed iteratively until some criterion is satisfied (e.g., a number of iterations); in some embodiments, the criterion may be adjusted based on user priorities (e.g., speed vs. precision). In some embodiments, the system 100 may display (e.g., via the display surface (208, FIG. 2)) to the user (104, FIG. 1) a positionable cursor 328. For example, the user 104 may position the cursor 328 to assist the system 100 in selecting, e.g., an edge 322, 324, 326 or intersection point of the target object 106. In some embodiments, the system 100 may be trained according to machine learning techniques, e.g., via a series of reference boxes of known dimensions as described below, to more quickly find an accurate intersection point 306a; prominent planes 312, 314, 316; and edges 322, 324, 326.

Figure 3E:
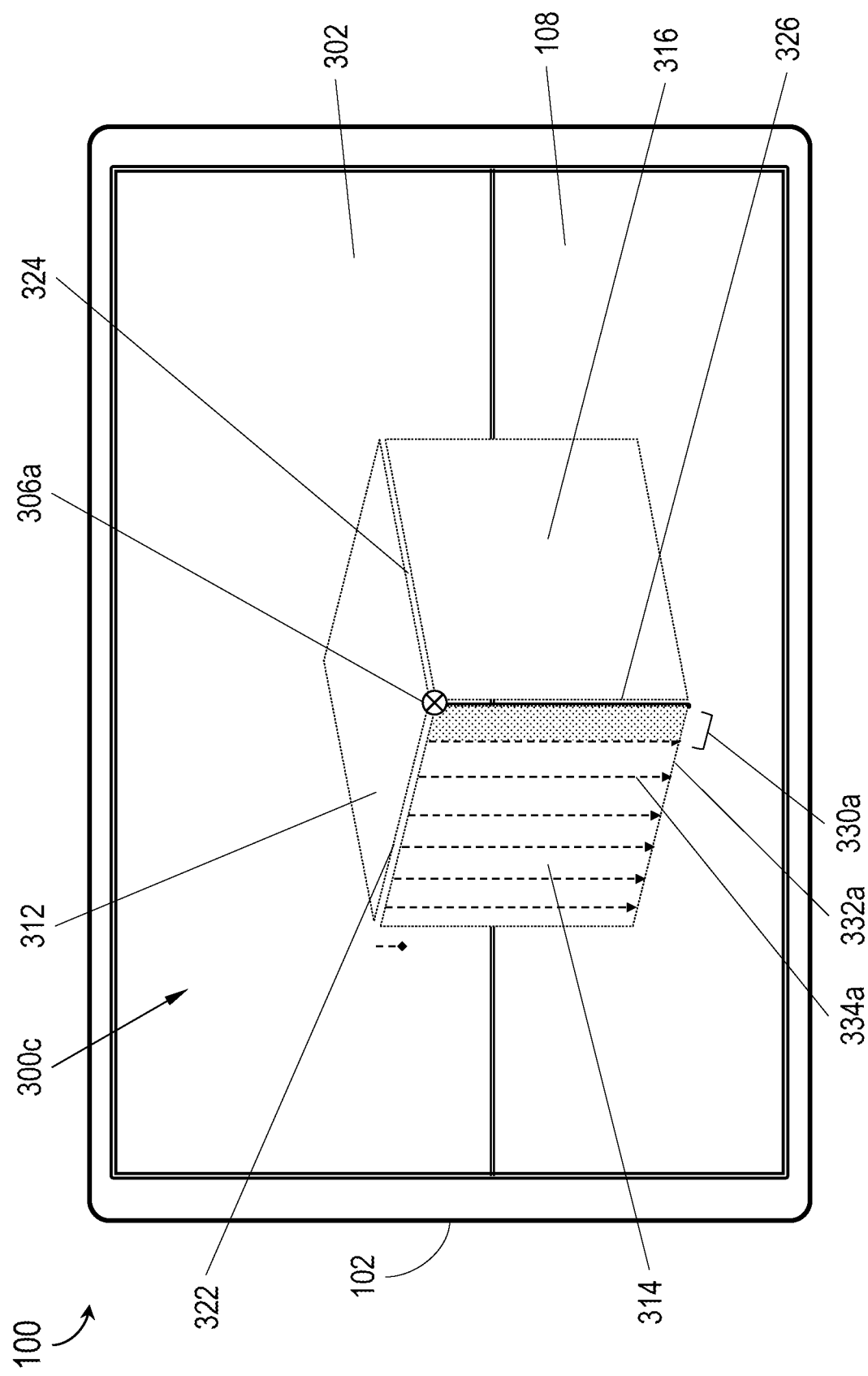
Figure 3F:
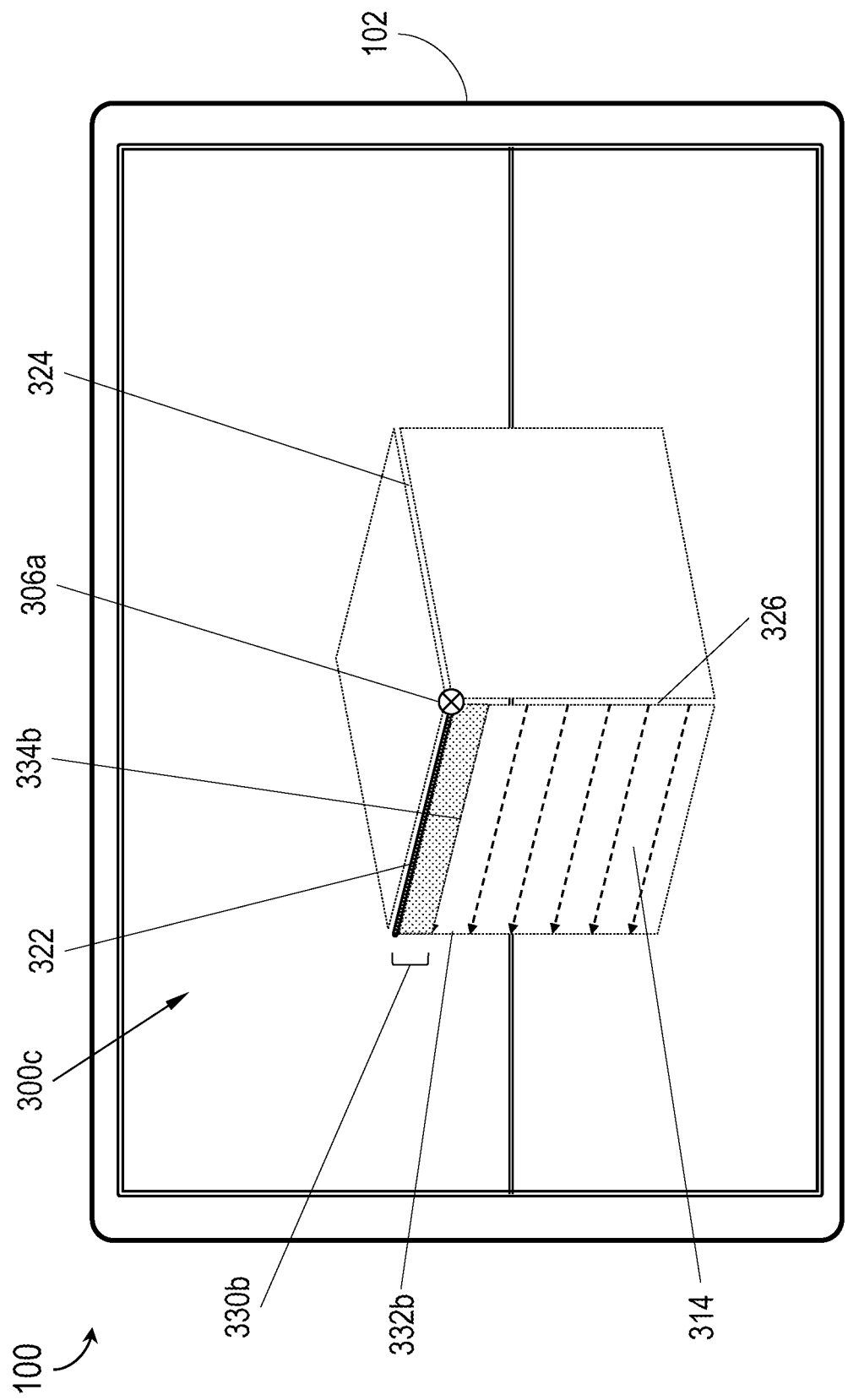
Figure 3G:
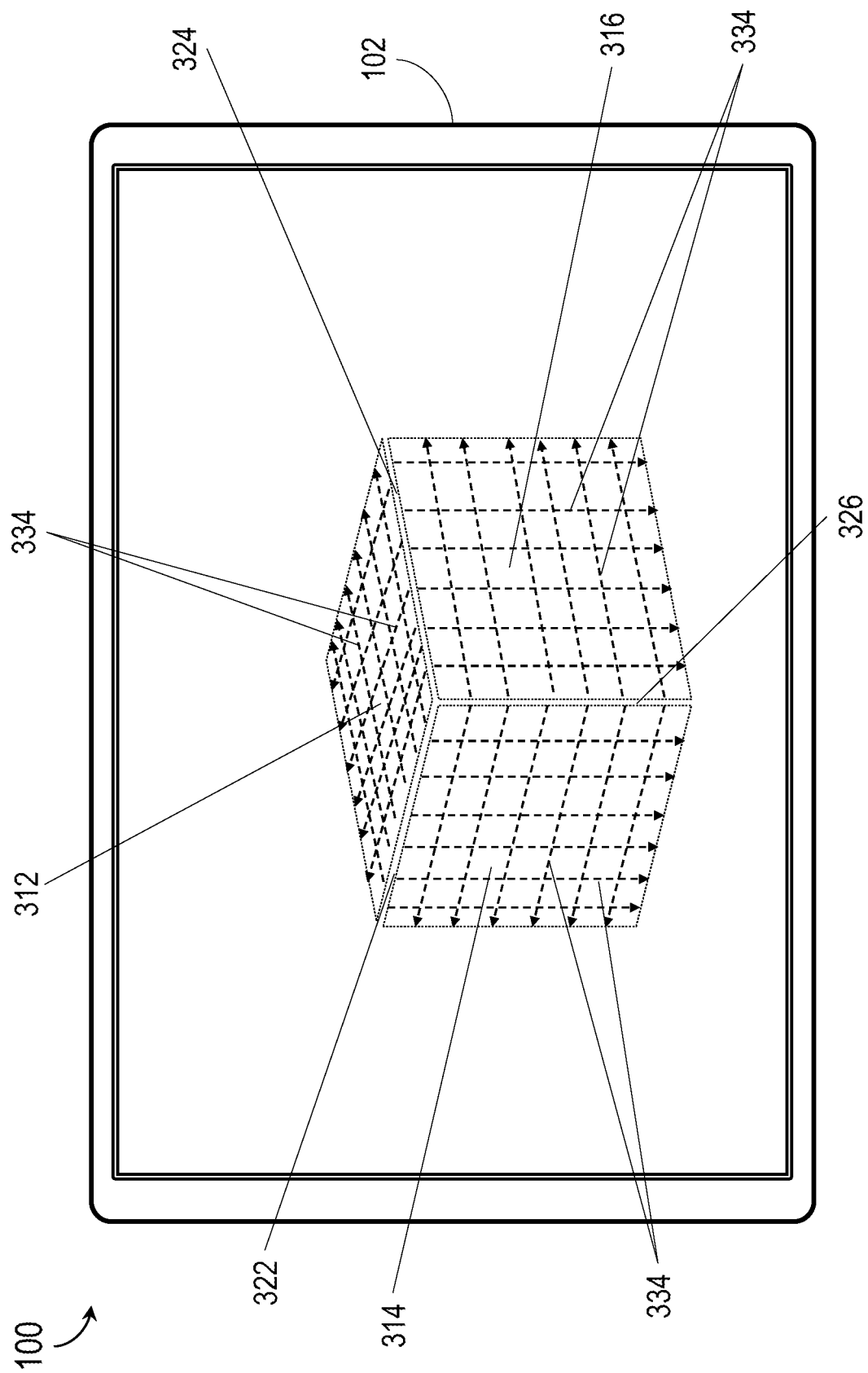

Referring also to FIGS. 3E-3G, the point cloud 300c may be implemented similarly to the point cloud of 300b of FIG. 3C, except that the system 100 may perform distance sampling of edge segments associated with the edges 322, 324, 326 identified by the prominent planes 312, 314, 316 of the point cloud 300b.

In embodiments, the system 100 may determine lengths of the edges 322, 324, 326 by measuring from the identified intersection point 306a along edge segments associated with the edges 322, 324, 326. The measurement of edge segment associated with edges 322, 324, 326 may be performed until a number of points are found in the point cloud 300c having a depth value indicating the points are not representative of the target object (106, FIG. 1), said non-representative points instead associated with, e.g., the flat surface 108 or the wall 302. The system 100 may then perform a calculation (e.g., a Euclidean distance calculation) between the corner point 306 and one or more measured points along the edge segment to determine a distance associated with the corresponding edge.

In embodiments, the system 100 may then perform a search at intervals 330a-c along the edges 322, 324, 326 to verify the previously measured edges 322, 324, 326. For example, the intervals 330a-c may be set based on the measured length of edge segments associated with edges 322, 324, 326. Additionally or alternatively, the intervals 330a-c may also be set according to, or may be adjusted, based on prior target objects dimensioned by the system 100 (or, e.g., based on reference boxes and objects stored to memory (226, FIG. 2)). In embodiments, the system 100 may perform nearest-neighbors searches (e.g., k-NN) of the point cloud 300c to identify a set of neighboring points 332a-c likely corresponding to the target object 106 within the intervals 330a-c. Based on the neighboring points 332, the system 100 may determine a plurality of distances 334a-c associated with the edges 322, 324, 326. Similar to determining the distance associated with the edge 322, 324, 326, the system 100 may then perform a calculation (e.g., a Euclidean distance calculation) between two furthest points among each of the intervals 330a-c to determine the plurality of distances 334a-c.

In embodiments, as shown by FIG. 3E, the search is performed on an identified prominent plane 314 (e.g., a candidate match for the left-side plane (116, FIG. 1)) to determine a distance 334a associated with the edge 326. For example, the edge 322, which has been previously measured from the corner point 306a, may be segmented into an interval 330a. The interval 330a may be searched from the edge 322 along the plane 314 to identify neighboring points 332a of the point cloud 300c. Based on the neighboring points 332a, the distance 334a may be determined. The search may then be repeated along the remaining intervals 330 of the edge 322 to determine a sample set of distances 334 associated with the edge 326. Based on the sample set, a length of the edge 326 may be determined (e.g., via a mean or median value of the sample set of distances 334).

In embodiments, as shown by FIG. 3F, the search may also be performed across the prominent plane 314 to determine a length 334b associated with the edge 322. For example, the edge 326, which had been previously measured from the corner point 306a, is segmented into intervals 330b. The interval 330b may be searched from the edge 326 to identify neighboring points 332b of the point cloud 300c. Based on the neighboring points 332a, the distance 334b may be determined. The search may then be repeated along one or more intervals 330b of the edge 326 to determine a sample set of distances 334b associated with the edge 322. Based on the sample set of distances 334b, a length of the edge 322 may be determined (e.g., via a mean value of the sample set of distances).

In embodiments, as shown by FIG. 3G, the search depicted in FIG. 3E-3F may also be performed on the identified prominent planes 312, 316 (e.g., candidate matches for, respectively, the right-side plane 118 and the top plane 120) to determine a sample set of distances 334, each distance 334 associated with the edge 324 (and, e.g., the edges 322, 326).

For example, each of the edges 322, 324, 326 may include distances 334 taken from multiple prominent planes 312, 314, 316. The edge 322 may have sample sets of distances 334 taken from the identified prominent planes 314, 316. By way of another example, the edge 324 may have a sample set of distances 334 taken from the identified prominent planes 312, 316. By way of another example, the edge 326 may have a sample set of distances 334 taken from the identified prominent planes 314, 316. By sampling multiple sets of distances 334 for each edge 322, 324, 326, the system 100 may account for general model or technology variations, errors, or holes (e.g., incompletions, gaps) in the 3D point cloud 300 which may skew individual edge measurements (particularly if the hole coincides with a corner (e.g., vertex, an endpoint of the edge).

In embodiments, the number and width of intervals 330 used to determine edge distances 334 is not intended to be limiting. For example, the interval 330 may be a fixed width for each plane. By way of another example, the interval 330 may be a percentage of the width of a measured edge. By way of another example, the interval 330 may be configured to vary according to a depth value of the points in the point cloud 300 (e.g., as the depth value indicates a further away point, the interval may be decreased). In this regard, a sensitivity of the interval may be increased.

In embodiments, the user (104, FIG. 1) may select a setting which indicates the target object 106 has an oblong shape (not depicted). Upon the selection by the user, a width of the interval 330 may be adjusted accordingly. In the case of a target object 106 with an extra-long plane, the width of the interval for the extra-long plane may be increased relative to the other planes. Similarly, in the case of a target object 106 with an extra-short plane, the width of the interval 330 for the extra-short plane may be decreased relative to the other planes.

Figure 3H:
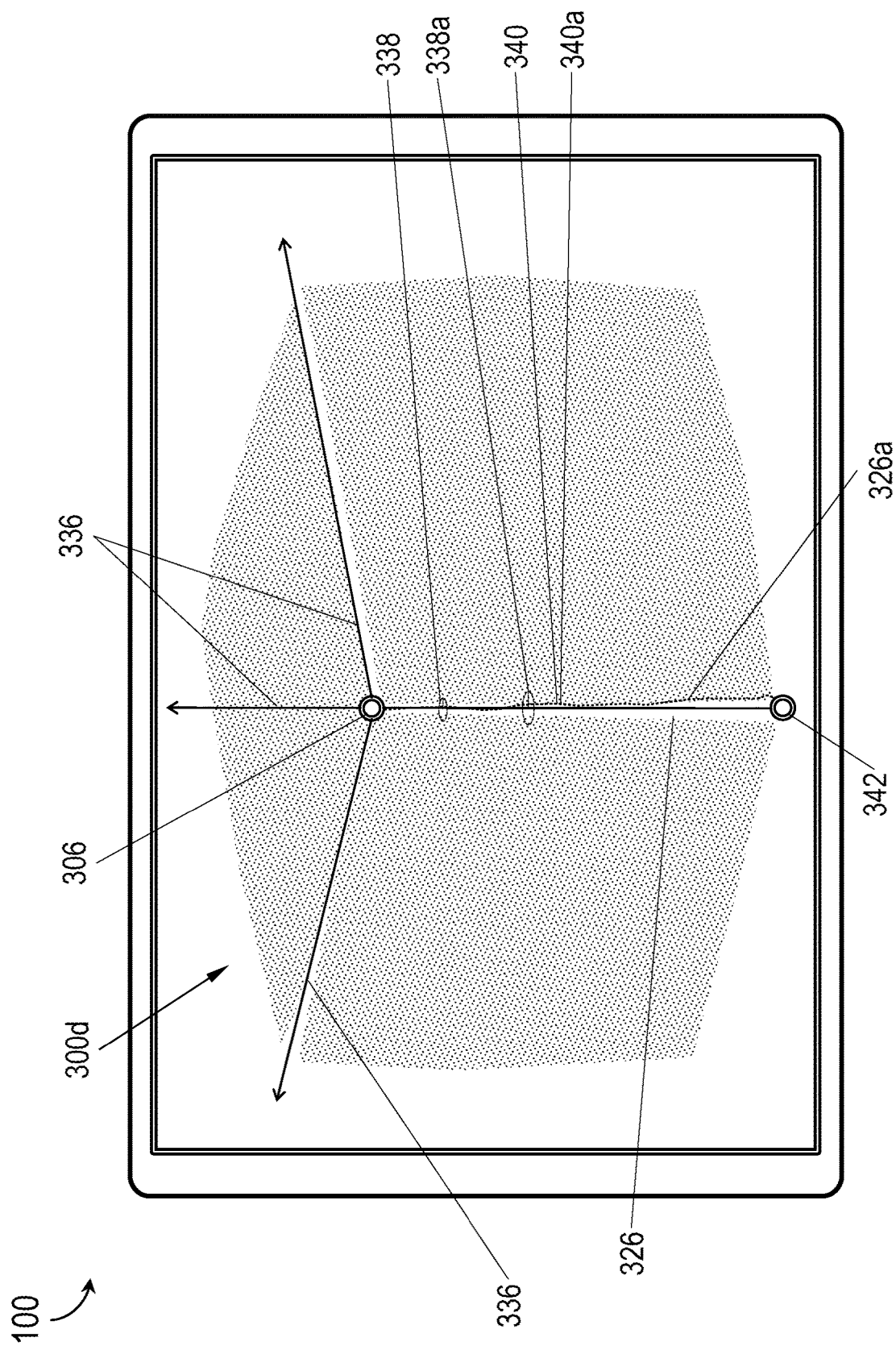
Figure 3I:
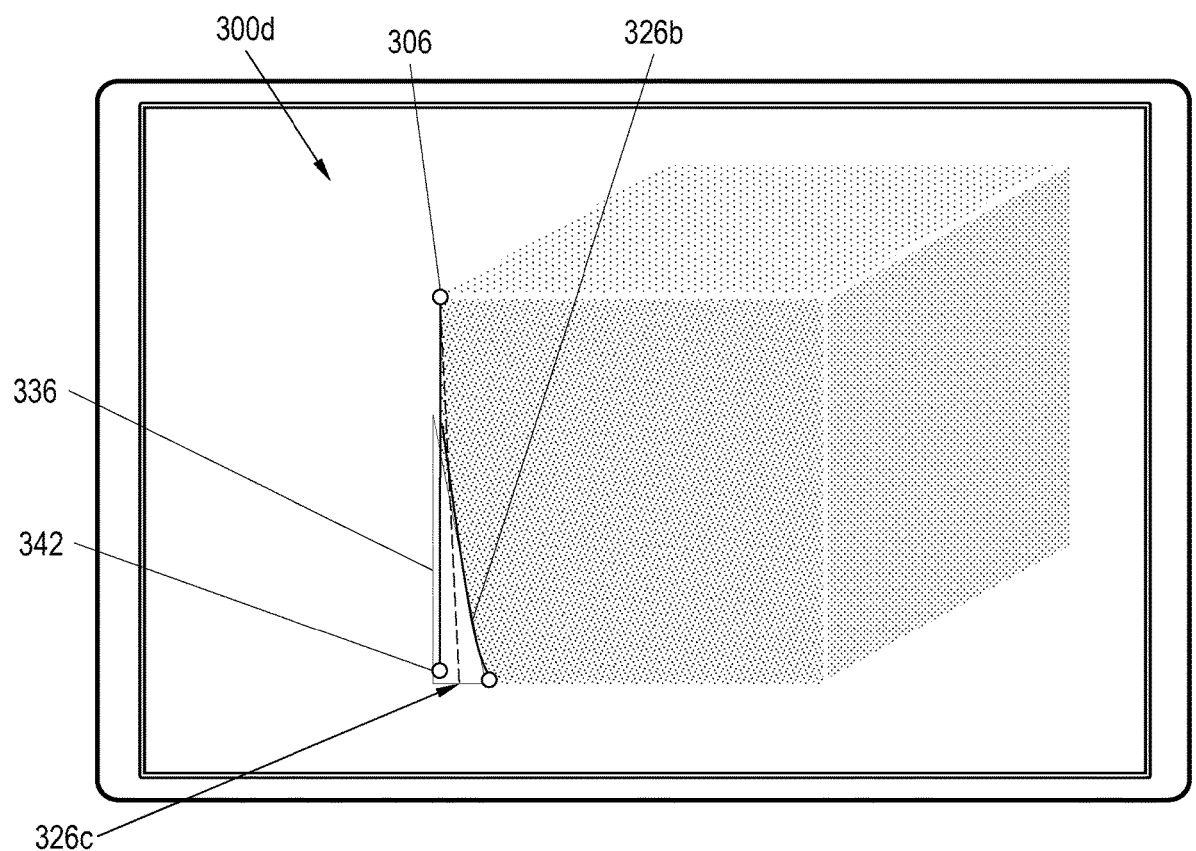

Referring also to FIGS. 3H and 3I, the point cloud 300d may be implemented similarly to the point cloud 300c of FIGS. 3E-3G, except that the system 100 may be configured to account for divergences of the point cloud 300d from one or more edge segments.

In embodiments, the system 100 may be configured to account for points in the point cloud 300d which diverge from identified edge segments. For example, the system 100 may segment prominent planes (312, 314, 316; FIG. 3G) and edges (322, 324, 326, FIG. 3G). The system 100 may establish edge vectors 336 along which the system may sample at intervals to establish distances of the edge segments 322, 324, 326 (and, e.g., refine each distance by sampling at intervals across each prominent plane 312, 314, 316, as shown by FIGS. 3E through 3G). However, as the system 100 samples along an edge vector 336 (e.g., associated with the edge segment 326) from the origin point 306 (or, e.g., from a refined intersection point (306a, FIGS. 3C/D)), the component points of the point cloud 300d may diverge from the edge vector. For example, the system 100 may begin by searching for points in the point cloud 300d within a radius 338 of the edge vector 336. As the component points of the point cloud 300d corresponding to the edge segment 326 diverge (326a) from the edge vector 336 (e.g., due to a reflectivity of the floor 108), the system 100 may need to enlarge the radius (338a) within which it searches for points corresponding to the edge 326. A significant divergence (326a) from the edge vector 336 may affect distance measuring.

In embodiments, the system 100 may account and/or compensate for the divergence by searching within the radius 338 of a previous point 340 (as opposed to, e.g., searching at intervals (330a-b, FIGS. 3E/F)) for the next point 340a of the edge segment 326a. For example, the edge vector 336 may be updated based on a weighted average of the initial or current vector and the vector from the previous point 340 to the next point 340a, updating the edge vector to account for the actual contour of the divergent edge segment (326a) as a component of the point cloud 300d.

In this regard, the system 100 may determine an updated edge segment 326b consistent with the point cloud 300d. The system 100 may then determine a distance of the edge 326 associated with the updated edge segment 326b, as discussed previously (e.g., by a Euclidean distance calculation). In some embodiments, the system 100 may generate a "true edge" 326c based on, e.g., weighted averages of the original edge vector 336 and the divergent edge segment 326a.

The ability to determine an updated edge segment 326b based on diverging points in the point cloud 300d may allow the system 100 to more accurately determine a dimension of the target object 106. In this regard, where the points diverge from the initial edge vector 336 (e.g., edge segment 326a) a search may prematurely determine that an end of the edge segment has been reached (e.g., because no close points are found within the radius 338), unless the system 100 is configured to account for the divergence. This may be true even if there are additional neighboring points (310, FIG. 3B) associated with the target object 106. Furthermore, where the target object 106 includes elongated planes and/or edges (see, e.g., FIGS. 4A/B below), any divergence of points from an edge segment 326 may be magnified through a crawl of the edge segment (e.g., from the origin point 306 to an endpoint 342), as compared to a shorter plane.

In embodiments, the system 100 is configured to capture and analyze 3D imaging data of the target object 106 at a plurality of orientations. For example, it may be impossible or impractical to capture the left-side plane, right-side plane, and top plane (116, 118, 12-0; FIG. 1) within the field of view of the mobile device 102, e.g., the target object 106 may be a cuboid having one or more highly elongated edges (402) and/or surfaces which may complicate radius searching and plane segmentation operations from a single perspective. Accordingly, in embodiments the system 100 may combine 3D imaging data from multiple perspectives to determine the dimensions of the target object 106.

Figure 4A:
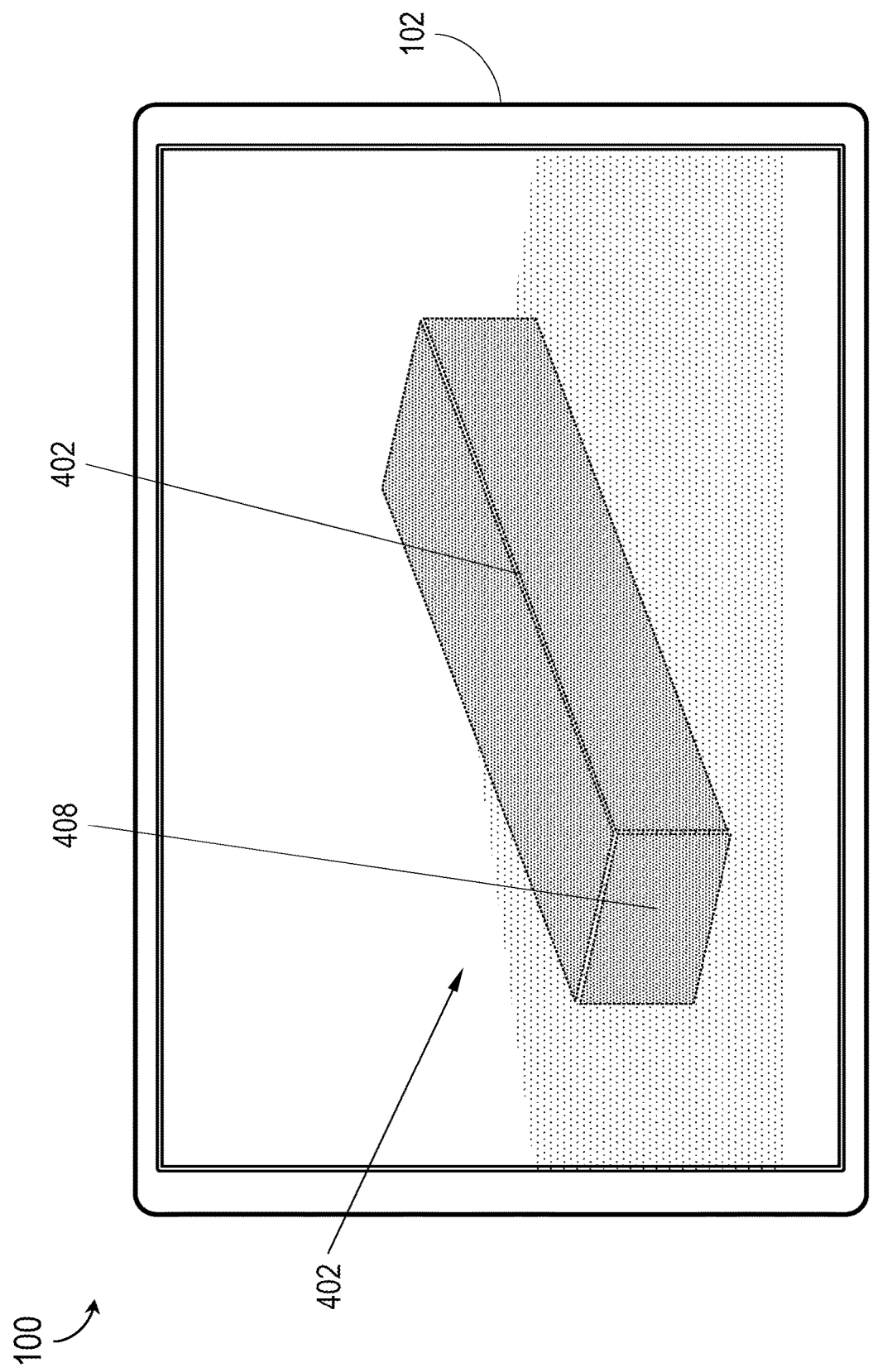
FIGS. 4A and 4B are diagrammatic illustrations of the mobile device of the volume dimensioning system of FIG. 1.
Figure 4B:
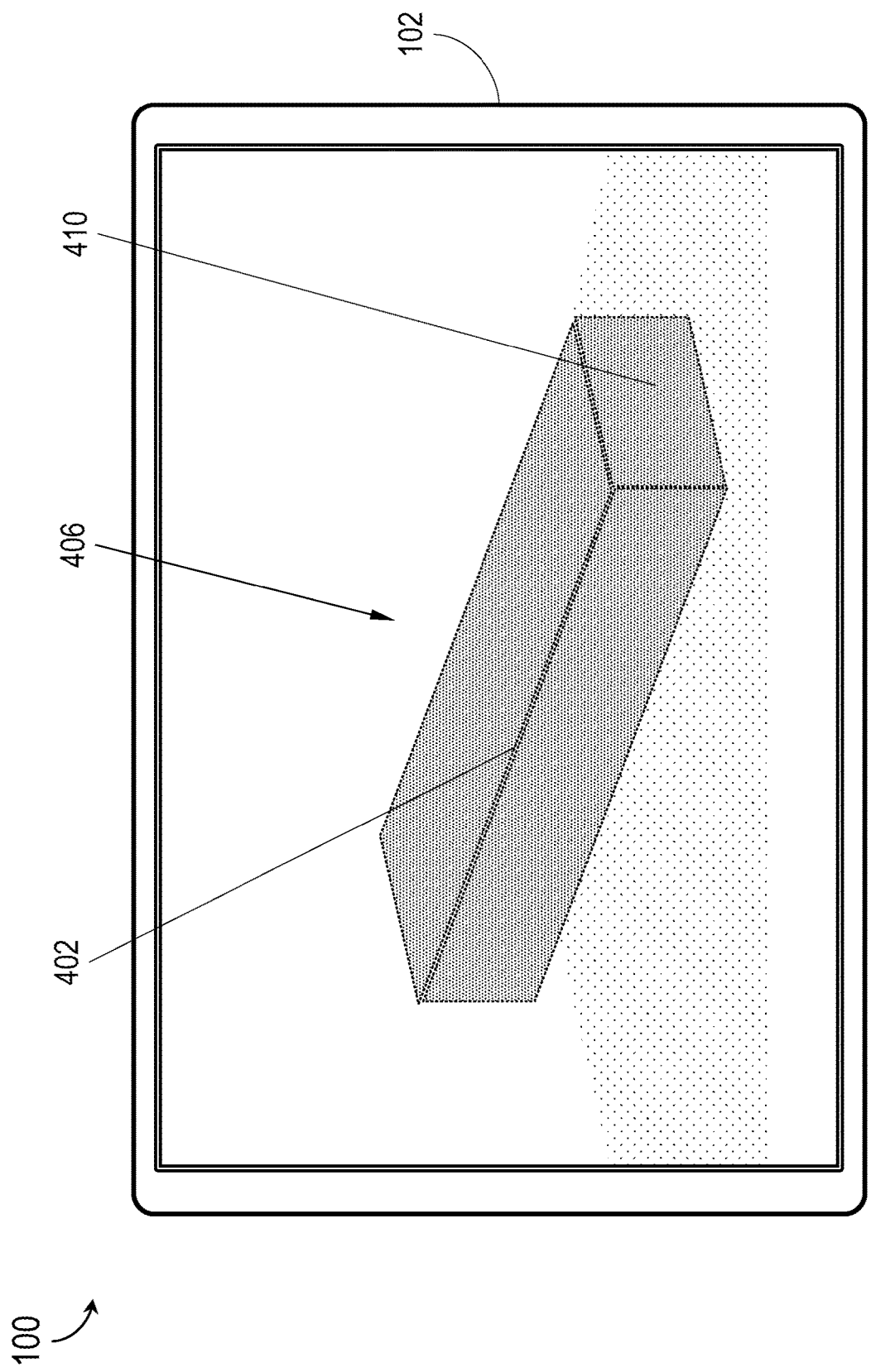

Referring to FIG. 4A, the system 100 may image the target object 106 at a first orientation to determine a first point cloud 404 (e.g., first frame dataset). As depicted in FIG. 4B, the system 100 may image the target object 106 at a second orientation to determine a second point cloud 406

(e.g., second frame dataset). The system 100 may further be configured for 3D reconstruction. Based on the first point cloud 404 and the second point cloud 406, the system 100 may construct a 3D reconstruction of the target object 106, e.g., matching the prominent plane 408 identified within the first point cloud 404 and the prominent plane 410 identified within the second point cloud 406 to a common prominent plane within the 3D reconstruction (e.g., 314, FIGS. 3A-F). The system 100 may then store the 3D reconstruction in a frame dataset (e.g., for determining one or more dimensions of the target object 106).

Figure 5A:
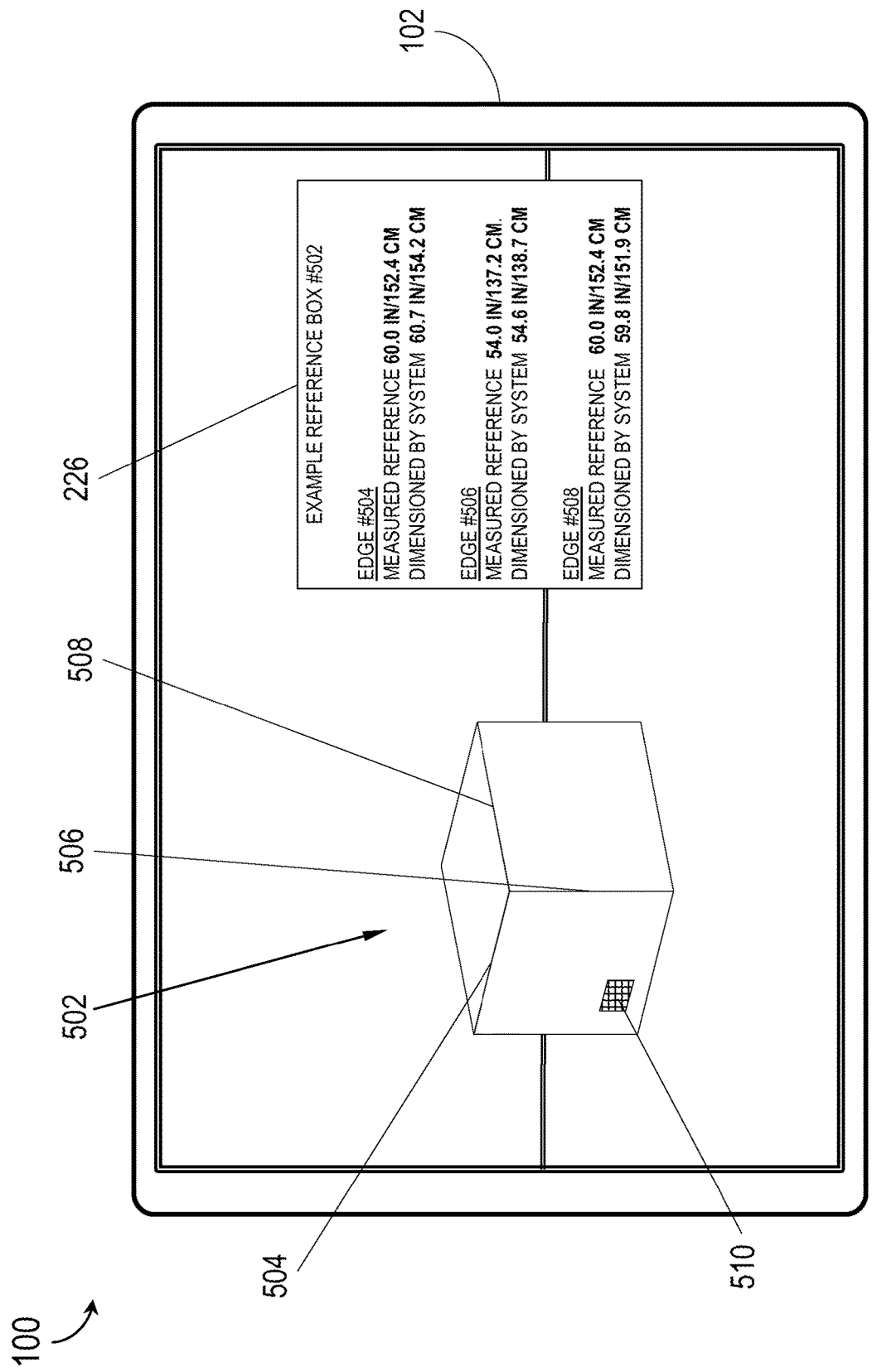
FIGS. 5A and 5B are diagrammatic illustrations of the mobile device of the volume dimensioning system of FIG. 1.

Referring to FIG. 5A, in embodiments the system 100 may be configured to dimension a target object 502 with edges 504, 506, and 508. For example, the system 100 may be configured to determine one or more dimensions of the target object 502 by plane segmentation and distance sampling (as discussed above). The determined dimensions may then be compiled in memory (226, FIG. 2) of the system 100. Similarly, one or more frames of image data captured by the 3D imager (e.g., an image stream) may be compiled with the determined dimensions in the memory 226. In this regard, the memory 226 may include captured images and dimensions determined based on the captured images.

In embodiments, the memory 226 may further include reference dimensions of the target object 502. Such reference dimensions may be the dimensions of the target object 502 which may be known or determined by a conventional measuring technique. For example, the system 100 may be tested according to machine learning techniques (e.g., via identifying reference objects and/or comparing test measurements to reference dimensions) to quickly and accurately (e.g., within 50 ms) dimension target objects (106, FIG. 1) according to National Type Evaluation Program (NTEP) accuracy standards.

In embodiments, the system 100 may then compare the determined dimensions and the reference dimensions to determine a difference between the determined dimensions and the reference dimensions. Such comparison may allow the system 100 to establish an accuracy of the determined dimensions. If the determined difference between the measured dimensions and the reference dimensions exceeds a threshold value, the system 100 may provide a notification to the user (104, FIG. 1). As may be understood, the threshold value can be any appropriate value (e.g., an absolute value, from 1 cm to 5 inches or more, or a relative value, e.g., ±2 percent of the total dimension of an edge 504-508). The threshold value may optionally be set by the user 104.

As may be understood, the target object 502 may include an identifier, such as a Quick-Response (QR) code 510 or other identifying information encoded in 2D or 3D format. The system may be configured to scan the QR code 510 of the target object 502 and thereby identify the target object 502 as a reference object. Furthermore, the QR code 504 may optionally include reference data particular to the target object 502, such as the reference dimensions. Although the target object 502 is depicted as including a QR code 504, this is not intended to limit the encoded information identifying the target object 502 as a reference object. In this regard, the user 104 may measure the reference dimensions of the target object 502. The user 104 may then input the reference dimensions to the system 100, saving the target object 502 as a reference object or augmenting any information corresponding to the reference object already stored to memory 226.

Figure 5B:
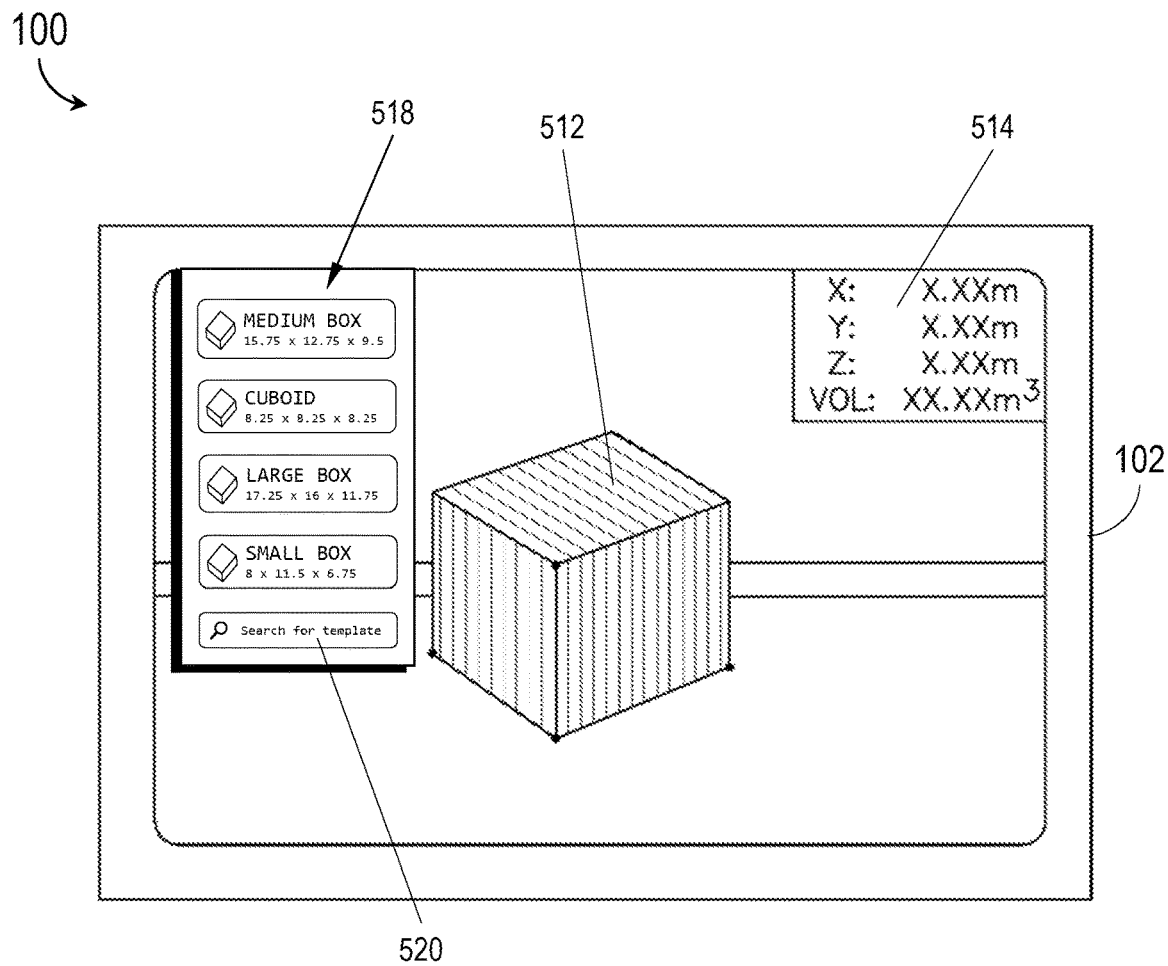
Figure 5B:
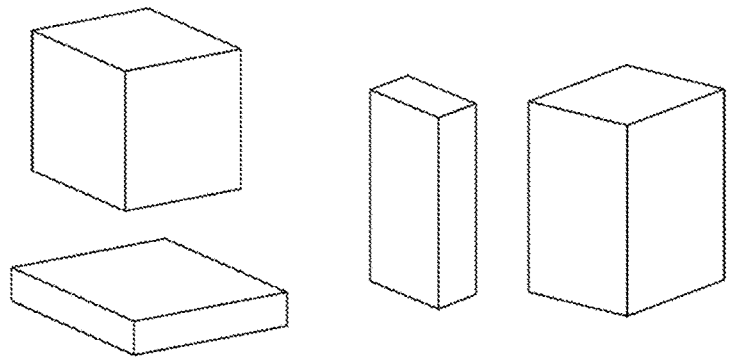

In embodiments, referring also to FIG. 5B, the system 100 may compare a compilation 512 of data determined by the system 100 to reference data (e.g., stored to the memory 226, FIG. 2) in order to make additional determinations with respect to the target object 502. For example, the compilation 512 may include determined dimensions 514 and frame of image data associated with the target box 502 after the dimensions of the target object 502 which have been determined to a sufficient level of accuracy or confidence.

In embodiments, the system 100 may compare the determined dimensions 514 of the target object 502 to the dimensions of reference shipping boxes (516) or predetermined reference templates (518) corresponding to shipping boxes or other known objects having known dimensions (e.g., stored to memory 226 or accessible via cloud-based storage (220, FIG. 2) or remote databases stored on physical servers (218, FIG. 2)). For example, the system 100 may display for the user's selection (e.g., via a searchable menu 520) reference templates 518 corresponding to storage containers, storage bins, or storage locations and sublocations within racking, shelving or organizing systems of various sizes. In embodiments, the user may compare the determined dimensions 514 of the target object 502 to a predetermined template 518, e.g., to determine, whether the target object 502 corresponds to a reference template 518 (e.g., within an adjustable margin), whether the target object 502 will fit inside a larger object or within a given shipping space, to audit and/or certify a dimension measurement (e.g., to NTEP standards), or to calibrate or verify the accuracy of the system 100. For example, the user may manually enter reference dimensions to which the measured dimensions 514 of the target object 502 may be compared (e.g., if the orientations of a template 518 do not precisely match a target object 502 to which the template dimensions may otherwise correspond). If insufficient information about the target object 502 is known (e.g., guidelines for storage, transport, or perishability), the system 100 may infer this information from what is known about similarly sized shipping boxes 516 or their contents. Similarly, the user may fill in the dimensions 514 of the target object 502 based on a corresponding template 518 that approximates or matches the dimensions of the target object 502. The user may create a new template by measuring a target object 502 and adding its dimensions 514 as a new known reference object. For example, the user 104 may create a template called "SMALL BOX" having predefined dimensions (e.g., 8.00 in×11.50 in×6.75 in), measuring a target object 502 corresponding to these dimensions via the system 100 to calibrate the system and "learn" the new template for future reference (or, e.g., determine if further training of the system is necessary).

Figure 6C:
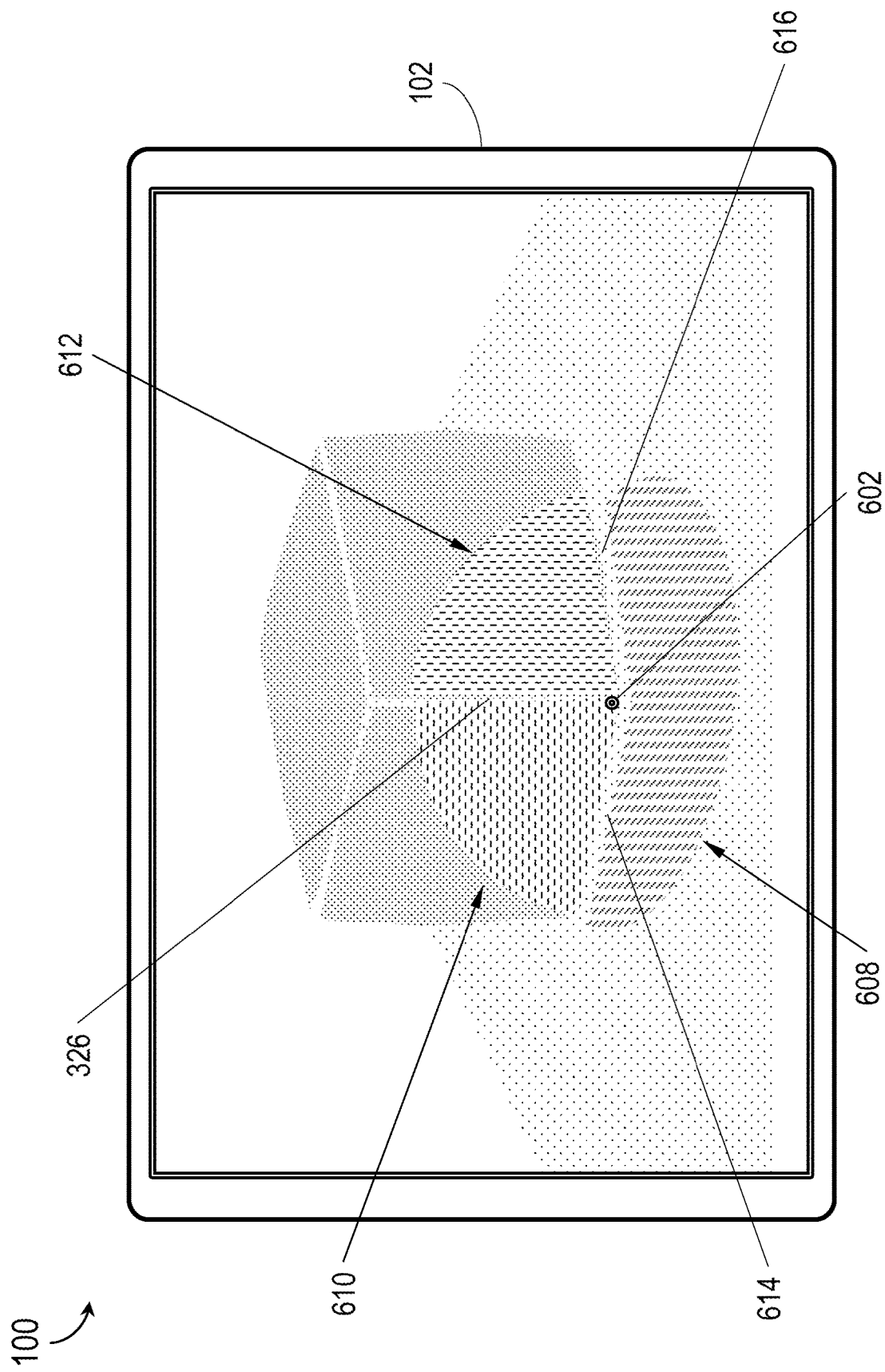

Referring generally to FIGS. 6A-6C, the system 100 may be configured to segment one or more background planes within the point cloud 300, e.g., a floor/flat surface 108 or wall 302. For example, it may not be possible to accurately identify or segment the three prominent planes (312, 314, 316; FIGS. 3A-F) and thus a plane segmentation may be augmented by inferring a prominent plane from the floor/flat surface 108 or wall 302.

In embodiments, referring in particular to FIG. 6A, a plane of the floor 108 (e.g., a floor plane) is to be segmented. For example, the 3D image sensors 204 may ray cast (304) directly ahead of the image sensors to identify a corner point 602. The corner point 602 may be disposed between the floor 108, the left-side prominent plane 314, and the right-side prominent plane 316. The corner point 602 may be determined by any suitable method, such as, but not limited to, the ray cast 304 based on a depth value of the corner point 602. For example, the left-side prominent plane 314 and the right-side prominent plane 316 may have depth values which converge on the corner point 602.

In embodiments, referring also to FIG. 6B, the system 100 may perform a radius search to determine a point segmentation 604 of neighboring points within a predetermined radius 606 from the corner point 602, in accordance with one or more embodiments of the present disclosure.

In embodiments, referring also to FIG. 6C, the system 100 may determine planes associated with the point segmentation 604, such as a floor plane 608, a left-side plane 610, and a right-side plane 612. The system 100 may further determine the edge 326 disposed between the left-side plane 610 and the right-side plane 612, an edge 614 disposed between the left-side plane 610 and the floor plane 608, and an edge 616 disposed between the right-side plane 612 and the floor plane 608, by an intersection of the planes 608, 610, 612. The system 100 may further perform an additional segmentation to refine the corner point 602 and iteratively determine the edges 326, 614, 616 as described above (see, e.g., FIGS. 3C/D and accompanying text). In embodiments, the ability to segment edges 614, 616 from the floor 108 may aid in addressing artifacts associated with a high reflectivity of the floor flat surface 108, e.g., especially near the edges 614, 616. For example, reflective artifacts may create a curl in the depth data reducing an accuracy of points in the point cloud (300, FIGS. 3C/D) near the edges 614, 616. Accordingly, the system 100 may compensate for curl artifacts by determining the edges 604, 606.

Referring generally to FIG. 7A-D, the system 100 may be configured to segment the floor 108 or the wall 302 when only two planes of the target object (106, FIG. 1) are visible to the 3D imager (204, FIG. 2). This may be beneficial where imaging three planes of a target object 700 via the 3D imager 204 is difficult (e.g., for an upright refrigerator or other tall object not compatible with the ideal orientation of mobile device (102, FIG. 1) to target object 106 shown by FIG. 1).

Figure 7A:
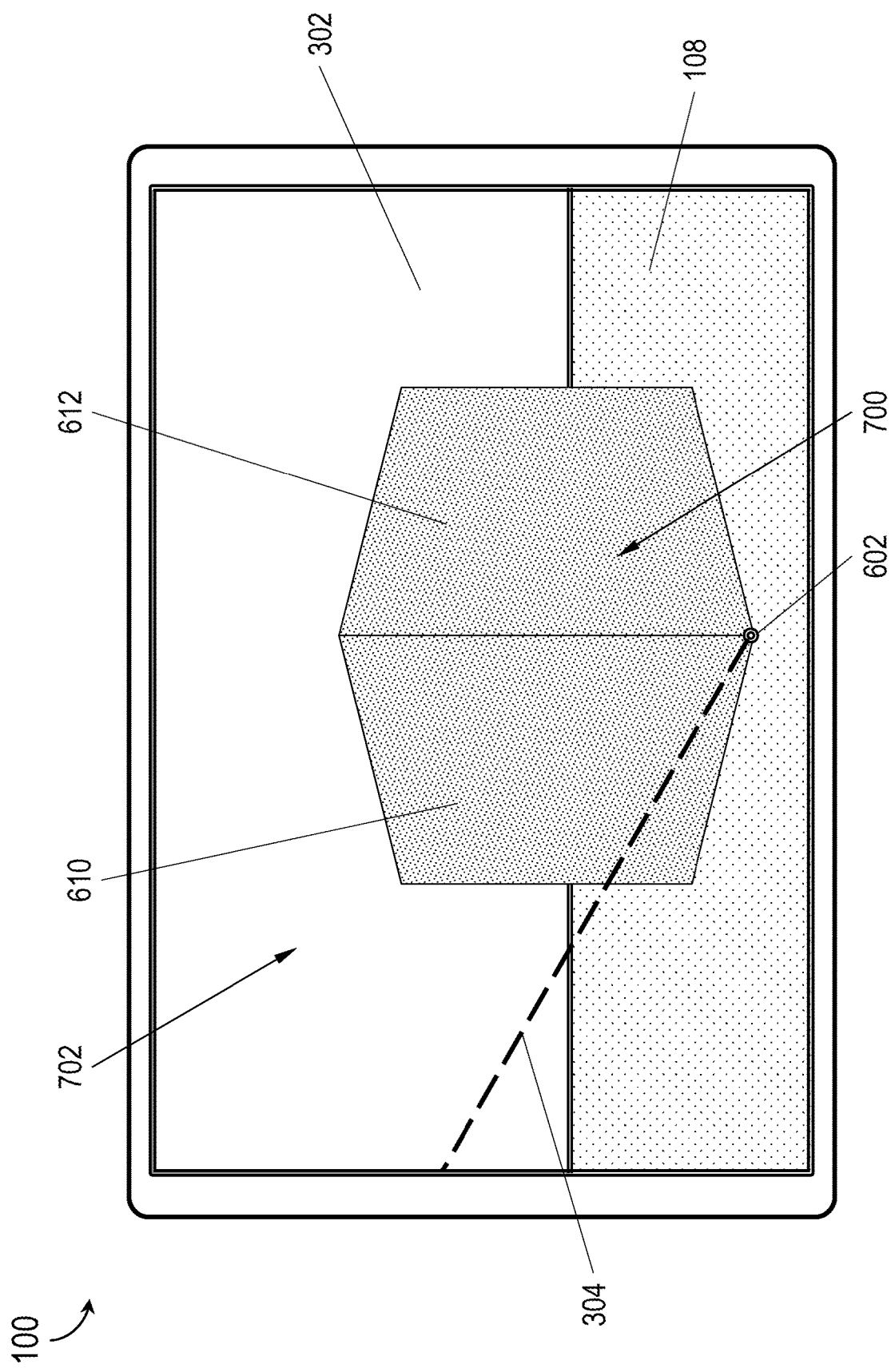

In embodiments, referring in particular to FIG. 7A, the system may obtain a point cloud 702 of the target object 700 when only the left-side plane 610 and the right-side plane 612 of the target object 106 are visible. For example, the 3D image sensors 204 may ray cast 304 directly ahead of the image sensors to identify a corner point 602, as discussed above in one or more embodiments.

In embodiments, referring also to FIG. 7B, the system 100 may perform radius searching based on a radius 703 from the corner point 602 to determine a point segmentation 604 as discussed above in one or more embodiments.

In embodiments, referring also to FIG. 7C, the system 100 may determine one or more segmented planes e.g., a floor plane 608, the left-side plane 610, and a right-side plane 612. The system 100 may further determine the edge 326 disposed between the left-side plane 610 and the right-side plane 612, the edge 614 disposed between the left-side plane 610 and the floor plane 608, and the edge 616 disposed between the right-side plane 612 and the floor plane 608, by an intersection of the planes 608, 610, 612.

Figure 7D:
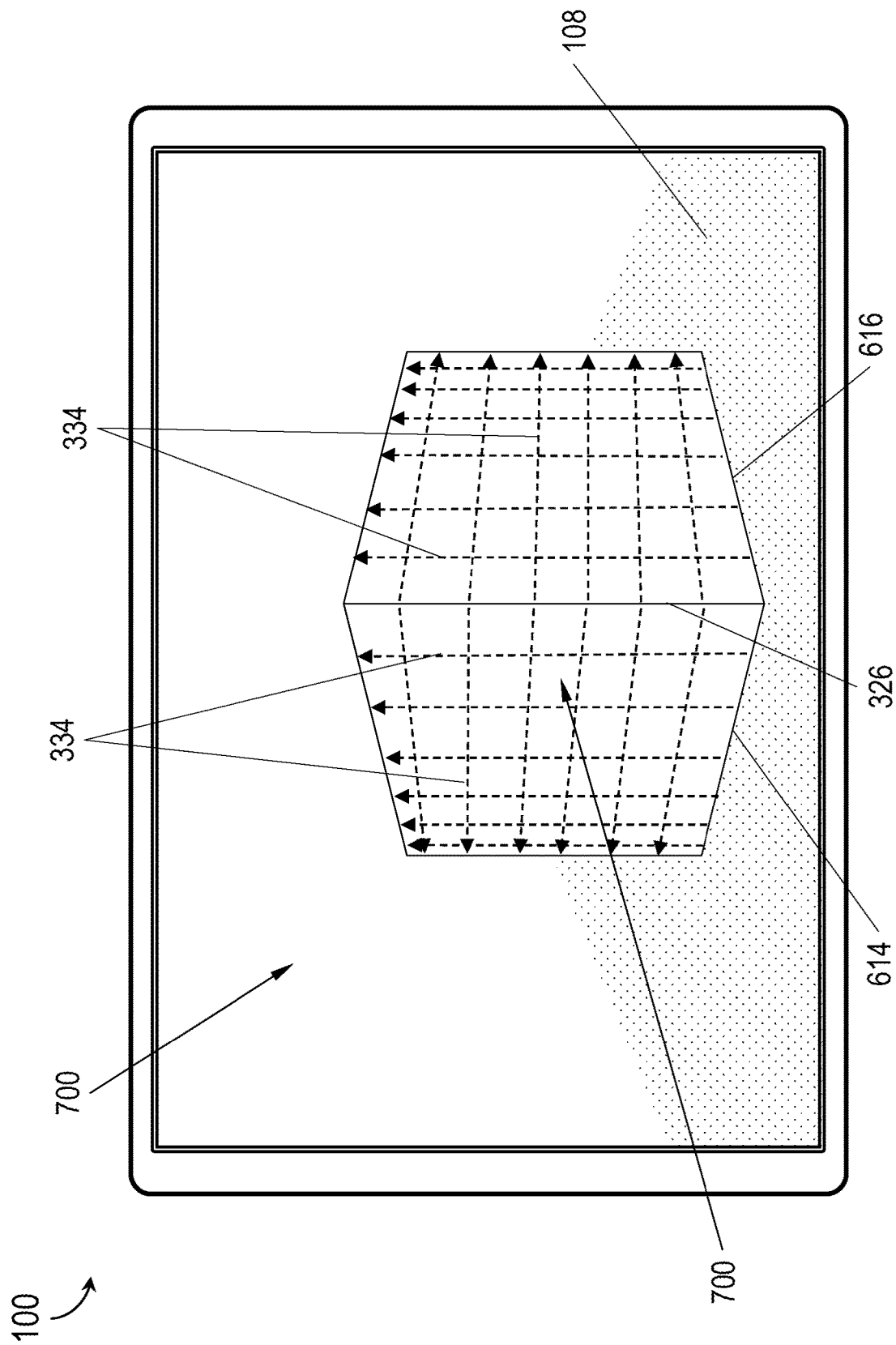
Figure 7E:
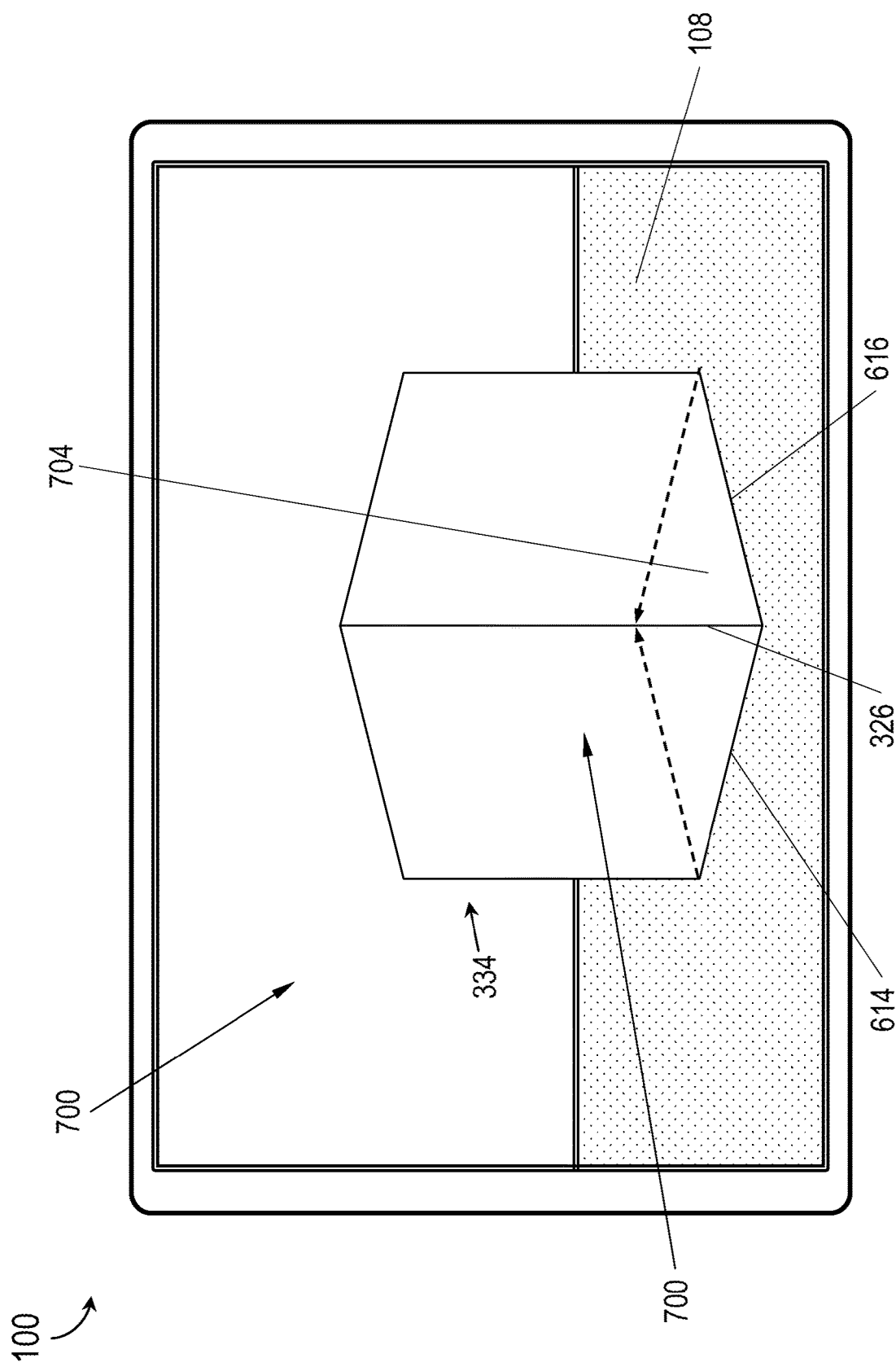

In embodiments, referring also to FIGS. 7D and 7E, a plurality of distances 334 associated with the edges 326, 614, and 616 may be determined, in accordance with one or more embodiments. Based on these distances 334, dimensions for edges 326, 614, and 616 may be determined (e.g., via a median value). Further, by dimensioning the edges 614 and 616, the system 100 may accurately dimension the top plane or surface (see, e.g., 312, FIGS. 3A-F) of the target object 700 (and substantially parallel both to the floor 108 and to a bottom surface 704 adjacent to the floor) although the top plane or surface may not be visible to the 3D imagers 204.

Figure 8:
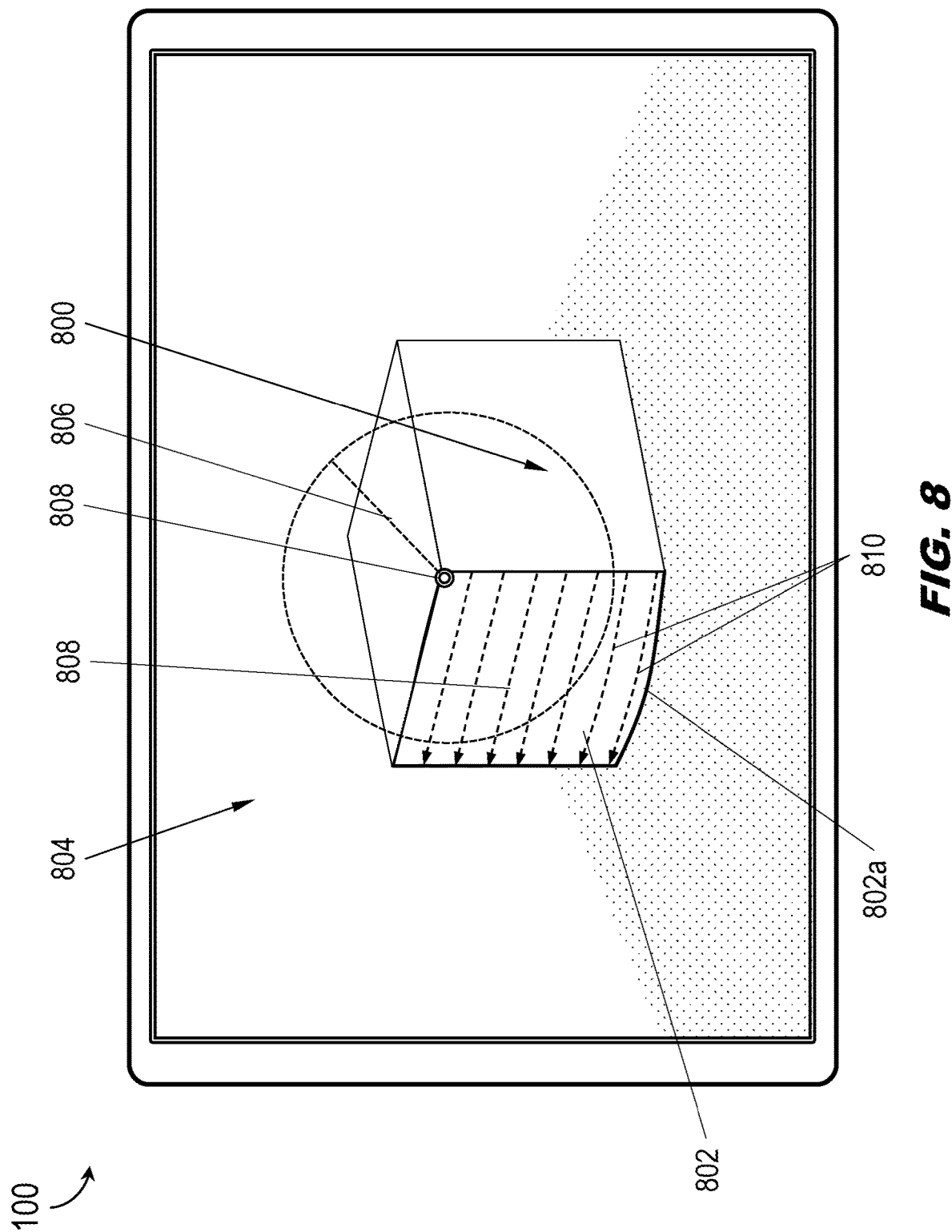
FIG. 8 is a diagrammatic illustration of the mobile device of the volume dimensioning system of FIG. 1.

Referring to FIG. 8, the system 100 may be configured to dimension a target object 800 with an anomalous plane 802 (e.g., and/or anomalous edge 802*a*). For example, the system 100 may generate a point cloud 804 and perform a radius search and a plane segmentation (604, FIGS. 6A-C) of the target object 800, as discussed previously. The plane segmentation 604 may attempt to determine three prominent planes (312, 314, 316; FIGS. 3A-G) typical to a cuboid object. The system 100 may further include a check to determine whether the plane segmentations determined are sufficiently in accordance with a target object having a substantially cuboid shape. In this regard, depth values associated with the points of the point cloud in the plane segmentation are expected to decrease, e.g., as a radius 806 increases from an origin point 808 corresponding to an intersection of prominent planes 312-316. However, a target object 800 with an anomalous plane 802 may have depth values which do not follow this trend (e.g., due to a bulge (anomalous edge 802*a*) in a wall of a box). Upon determining the presence of the anomalous plane 802, the system 100 may adjust a sampling of edge distances 334 based on the anomalous plane 802 (e.g., to identify and eliminate outlying or inconsistent edge distances 810).

Figure 9A:
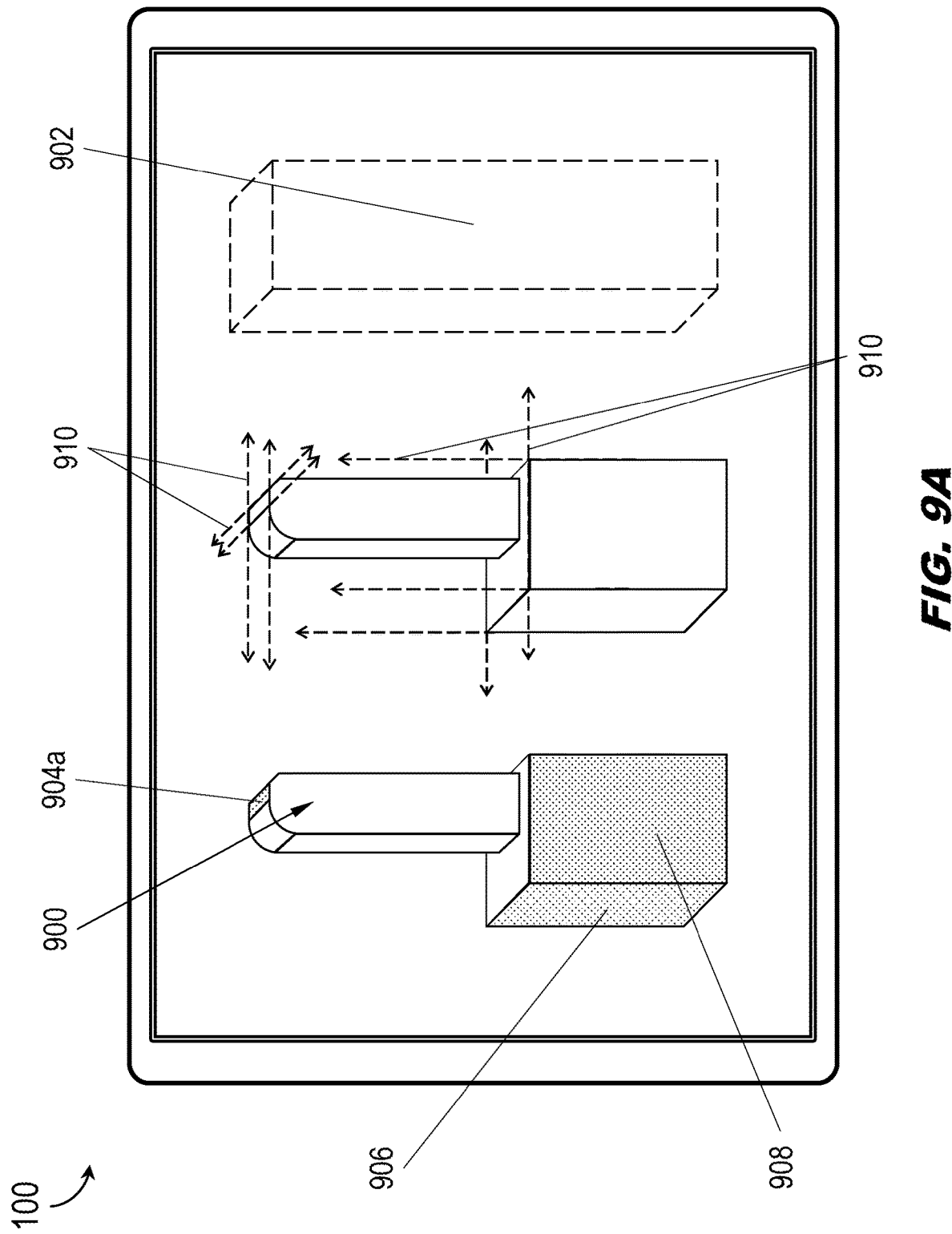
FIGS. 9A through 9C are diagrammatic illustrations of the mobile device of the volume dimensioning system of FIG. 1.
Figure 9B:
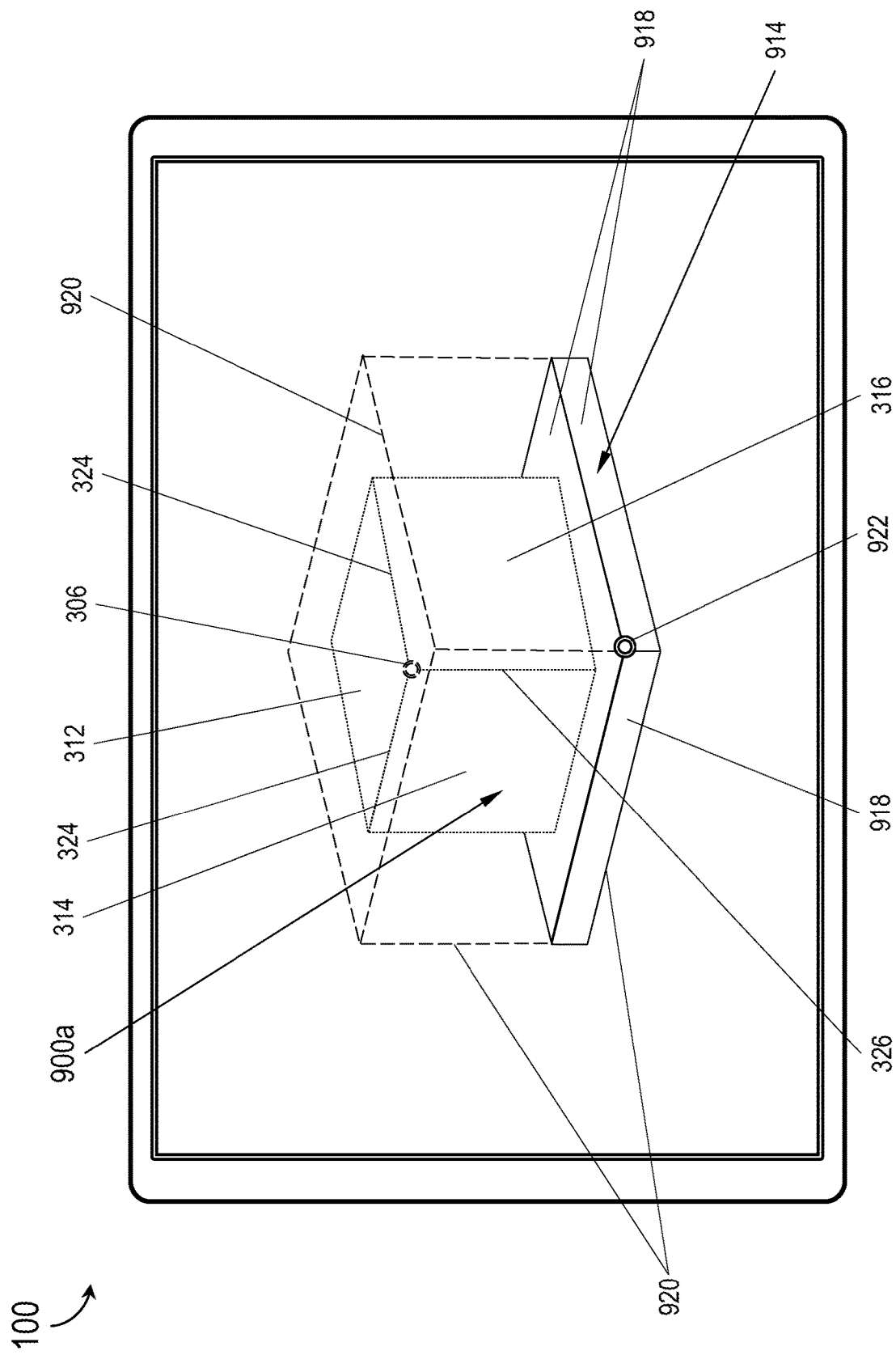
Figure 9C:
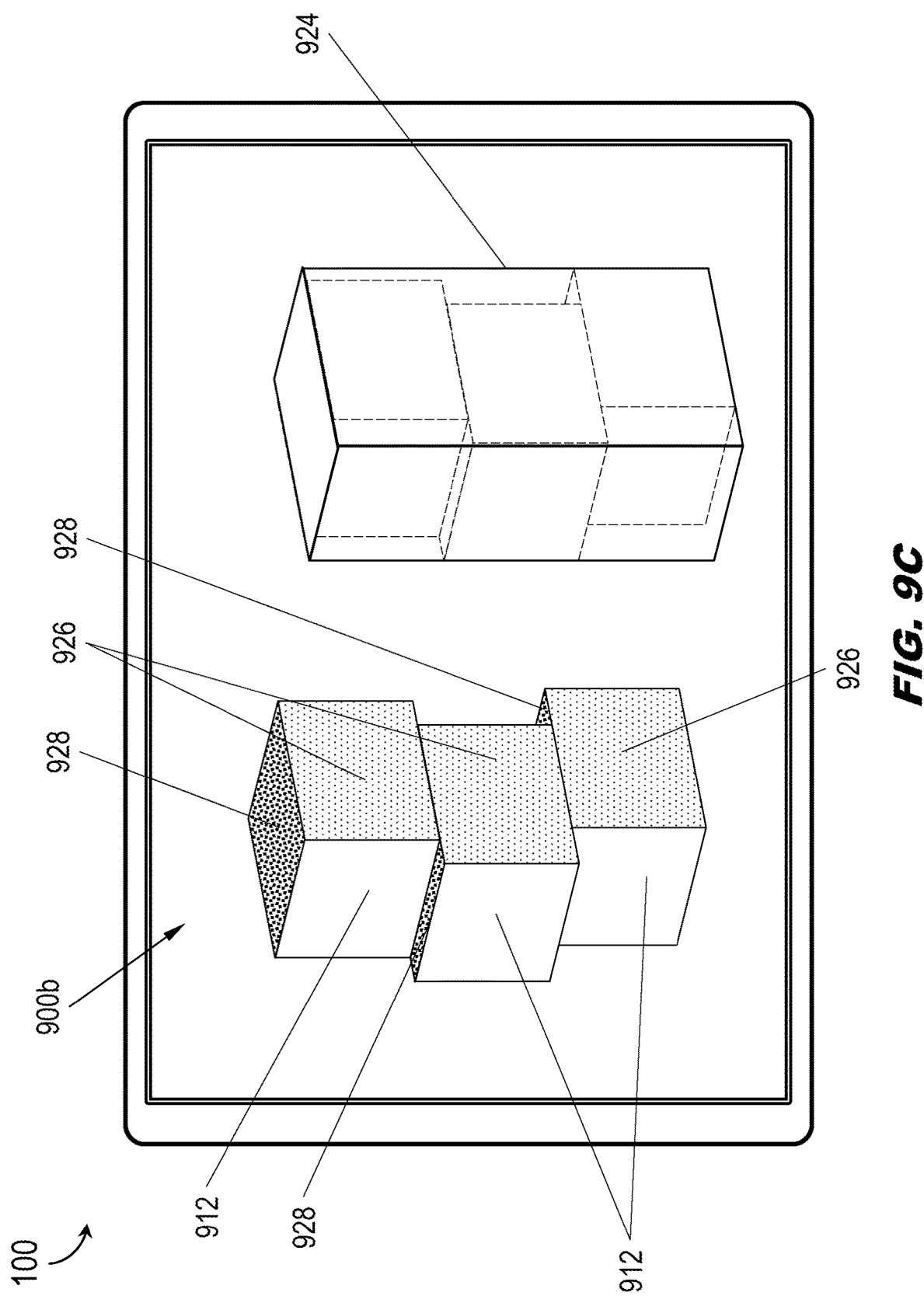

Referring generally to FIG. 9A through 9C, the system 100 may be configured to dimension a nonstandard target object 900, e.g., target objects having a substantially non-cuboid shape, collections of objects stacked upon either other, or objects positioned upon a pallet or like shipping structure. For example, the system 100 may be trained according to machine learning techniques, and based on example templates, to identify and dimension particular types of nonstandard target objects (e.g., or groups thereof, as described below).

In embodiments, referring in particular to FIG. 9A, the target object 900 may have a substantially non-cuboid shape, e.g., a shipping container for a chainsaw or similar object in a non-cuboid container. For example, the target object 900 may present inconsistent planes and edges through several iterations of ray casting, radius searching, and plane segmentation (see, e.g., FIGS. 3A-G and accompanying text above). In embodiments, the system 100 may fit the target object 900 into a bounding box 902 by segmenting extreme planes 904, 906, 908 (e.g., based on extreme depth values and/or distance information) and extending the edges 910 of the extreme planes. For example, the system 100 may determine (e.g., which determination may include additional user input or may be taught to the system according to machine learning techniques and common nonstandard objects) that the bounding box 902 is the minimum bounding box, e.g., the smallest possible bounding box capable of completely enclosing the target object 900.

Referring now to FIGS. 9B and 9C, the nonstandard target objects 900*a-b* may be implemented similarly to the nonstandard target object 900 of FIG. 9A, except that the nonstandard target object 900*a* may be positioned on/attached to a pallet 914 or other similar shipping structure or foundation, and the nonstandard target object 900*b* may consist of two or more stacked sub-objects 912.

In embodiments, referring in particular to FIG. 9B, the system 100 may account for any pallets 914 or other shipping structures/foundations 820 to which the nonstandard target object 900*a* is attached, determining the minimum possible dimensions 916 (e.g., a minimum bounding box) of the palleted nonstandard target object 900*a* (e.g., based on the minimum possible amount of shelf space the nonstandard target object 900a attached to the pallet 914 would occupy in a vehicle, in a warehouse, or elsewhere in the supply chain) in addition to the dimensions of the nonstandard target object 900a without the pallet 914. For example, the system 100 may account for the pallet 914 by distinguishing segments consistent with the pallet (e.g., plane segments 918, edges 920) from plane segments 312, 314, 316 and/or edges 322, 324, 326 consistent with the target object 900a (e.g., unpalleted box) itself. Accordingly, the system 100 may determine a corner point 306 associated with the target object 900a proper, and a corner point 922 associated with the pallet 914. Such plane and edge segmentation operations may be assisted by input from the user (104, FIG. 1); e.g., the system 100 may prompt the user that a palleted target object 900a has been identified and request the user affirm that this is the case, whereby the system 100 may proceed with pallet-focused radius searching and plane segmentation operations.

Referring now to FIG. 9C, the nonstandard target object 900b and the nonstandard target object 900b may consist of two or more stacked identical sub-objects 912. In embodiments, the system 100 may generate a minimum bounding box 924 enclosing the stacked sub-objects 912 according to one or more dimensioning operations as disclosed above. In some embodiments, the system 100 may further analyze the point cloud including the nonstandard target object 900b to distinguish common or shared prominent planes (926) from inconsistent prominent planes (928). For example, the system 100 may prompt the user 104 to affirm that the target object 900b is a stack of sub-objects 912, and may further prompt the user to identify boundaries 930 between the sub-objects, such that an accurate dimension of each individual sub-object may be measured.

Figure 10A:
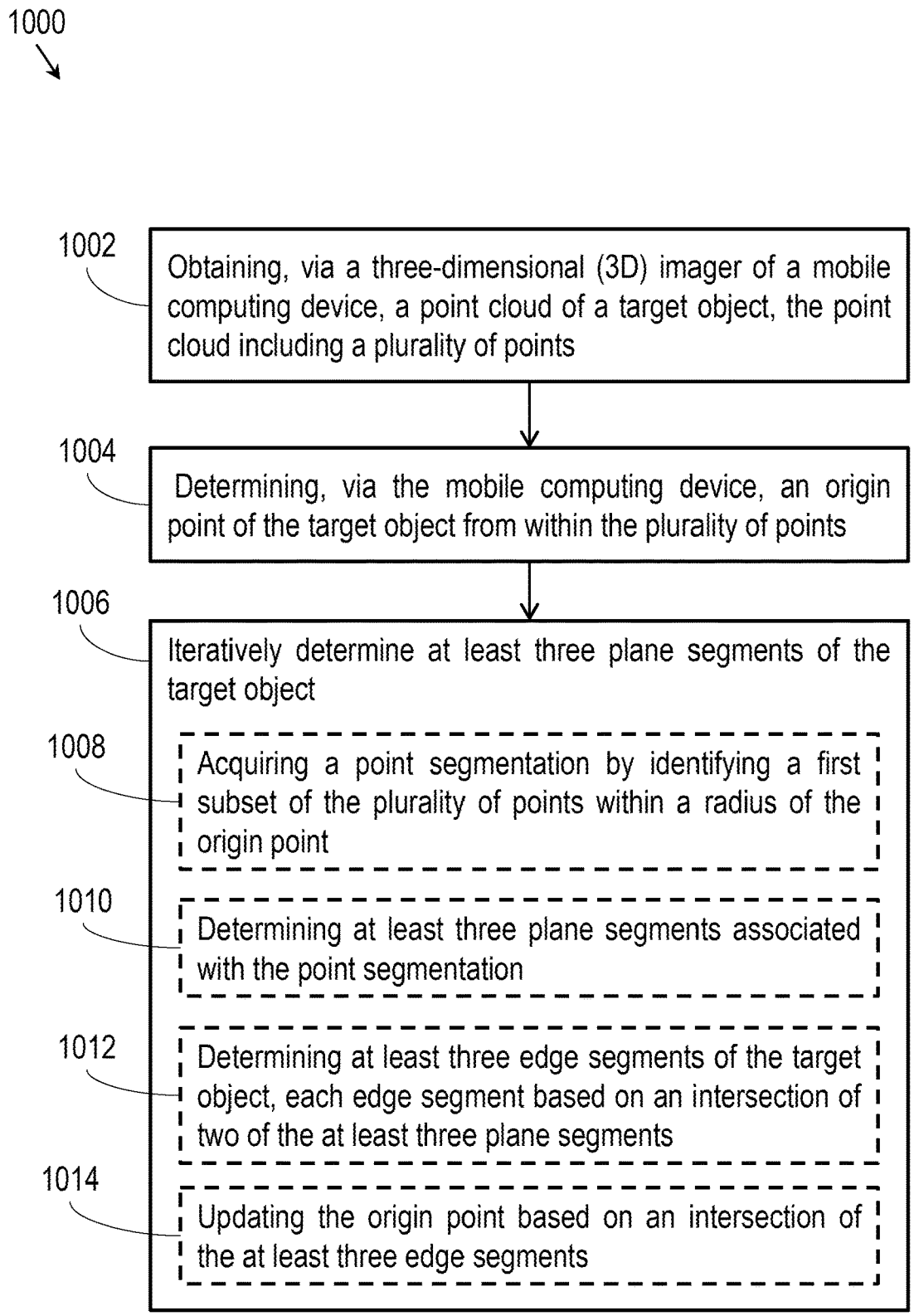
FIGS. 10A and 10B are a flow diagram illustrating a method for volume dimensioning, in accordance with one or more embodiments of the present disclosure.
Figure 10B:
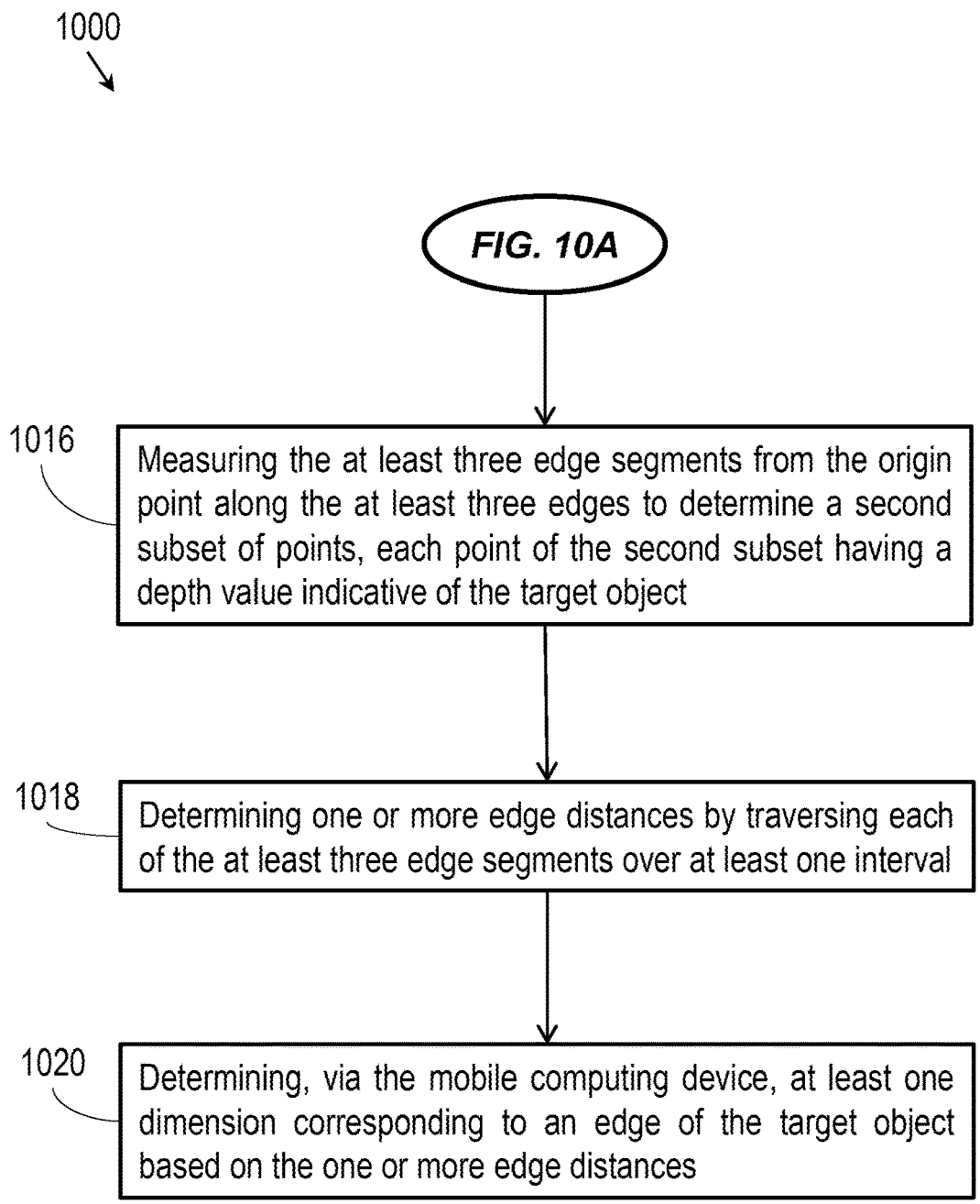

Referring to FIG. 10, a method 1000 for dimensioning an object may be implemented by embodiments of the system 100.

At a step 1002, a three-dimensional (3D) image stream of a target box positioned on a background surface may be obtained. The 3D image stream may be captured via a mobile computing device. The 3D image stream may include a sequence of frames. Each frame in the sequence of frame may include a plurality of points (e.g., a point cloud). Each point in the plurality of points may have an associated depth value.

At a step 1004, at least one origin point within the 3D image stream may be determined. The origin point may be identified via the mobile computing device. The origin point may be determined based on the depth values associated with the plurality of points. In this regard, the origin point may have a depth value indicating, of all the points, the origin point is closest to the mobile computing device.

At a step 1006, at least three plane segments of the target object may be iteratively determined. The at least three plane segments may be determined via the mobile computing device. Furthermore, step 1006 may include iteratively performing steps 1008 through 1014, discussed below.

At a step 1008, a point segmentation may be acquired. The point segmentation may include at least one subset of points within a radius of the origin point. The subset of points may be identified via the mobile computing device. The radius may also be predetermined.

At a step 1010, a plurality of plane segments may be identified. For example, two or three plane segments may be acquired. The plurality of plane segments may be identified by sampling the subset of neighboring points via the mobile computing device. Each of the plurality of plane segments may be associated with a surface of the target box. In some embodiments, three plane segments are determined, although this is not intended to be limiting.

At a step 1012, a plurality of edge segments may be identified. The plurality of edge segments may be identified via the mobile computing device. The edge segments may correspond to an edge of the target box. Similarly, the edge segments may correspond to an intersection of two adjacent plane segments of the plurality of plane segments. In some embodiments, three edge segments are determined, although this is not intended to be limiting.

At a step 1014, an updated origin point of may be determined. The updated origin point may be based on an intersection of the edge segments or an intersection of the plane segments. Steps 1008 through 1014 may then be iterated until a criterion is met. In some instances, the criterion is a number of iterations (e.g., 2 iterations).

At a step 1016, the edge segments may be measured from the origin point along the edge segments to determine a second subset of points. Each point in the second subset of points may include a depth value indicative of the target object. In this regard, the edge segments may be measured to determine an estimated dimension of the target object. However, further accuracy may be required.

At a step 1018, one or more edge distances are determined by traversing each of the at least three edge segments over at least one interval. The interval may be based in part by the measured edge segments from step 1016. Furthermore, the edge distances may be determined by sampling one or more distances across the point cloud, where each sampled distance is substantially parallel to the edge segment.

At a step 1020, one or more dimensions corresponding to an edge of the target box may be determined based on the one or more edge distances. The determination may be performed via the mobile computing device. The determination may be based on a median value of the one or more edge distances.

Referring generally to FIGS. 1A-10B, the system 100 is described herein. In some embodiments, the system 100 may account for imperfect data sets, e.g., gaps or holes in the point cloud, via plane identification. For example, the system may analyze 3D spatial information to infer the planes of the target object 106, e.g., on the basis of a sufficient number of identified points aligned in a plane or nearly enough aligned (e.g., within a predetermined range) to derive the existence of a plane. By utilizing plane identification based solely on 3D spatial information collected by the 3D imager 204, the system 100 may identify the target object 106 and its component planes quickly enough, or to a sufficient level of confidence, to meet user 104 needs. In this regard, system 100 must be faster than manually measuring the target object 106.

In embodiments, the system 100 may be trained via machine learning to recognize and lock onto a target object 106, positively identifying the target object and distinguishing the target object from its surrounding environment (e.g., the field of view of the 2D imager 202 and 3D imager 204 including the target object as well as other candidate objects, which may additionally be locked onto as target objects and dimensioned). For example, the system 100 may include a recognition engine trained on positive and negative images of a particular object specific to a desired use case. As the recognition engine has access to location and timing data corresponding to each image or image stream (e.g., determined by a clock 212/GPS receiver 214 or similar position sensors of the embodying mobile device 102 or collected from image metadata), the recognition engine may be trained to specific latitudes, longitudes, and locations, such that the performance of the recognition engine may be driven in part by the current location of the mobile device 102*a*, the current time of day, the current time of year, or some combination thereof.

A holographic model may be generated based on edge distances determined by the system. Once the holographic model is generated by the system 100, the user 104 may manipulate the holographic model as displayed by a display surface of the device 102. For example, by sliding his/her finger across the touch-sensitive display surface, the user 104 may move the holographic model relative to the display surface (e.g., and relative to the 3D image data 128 and target object 106) or rotate the holographic model. Similarly, candidate parameters of the holographic model (e.g., corner point 306; edges 322, 324, 326; planes 312, 314, 316; etc.) may be shifted, resized, or corrected as shown below. In embodiments, the holographic model may be manipulated based on aural control input submitted by the user 104. For example, the system 100 may respond to verbal commands from the user 104 (e.g., to shift or rotate the holographic model, etc.)

In embodiments, the system 100 may adjust the measuring process (e.g., based on control input from the operator) for increased accuracy or speed. For example, the measurement of a given dimension may be based on multiple readings or pollings of the holographic model (e.g., by generating multiple holographic models per second on a frame-by-frame basis and selecting "good" measurements to generate a result set (e.g., 10 measurement sets) for averaging). Alternatively or additionally, a plurality of measurements over multiple frames of edges 322, 324, 326 may be averaged to determine a given dimension. Similarly, if edges measure within a predetermined threshold (e.g., 5 mm), the measurement may be counted as a "good" reading for purposes of inclusion within a result set. In some embodiments, the confirmation tolerance may be increased by requiring edges 322, 324, 326 to be within the threshold variance for inclusion in the result set.

In some embodiments, the system 100 may proceed at a reduced confidence level if measurements cannot be established at full confidence. For example, the exterior surface of the target object 106 may be matte-finished, light-absorbing, or otherwise treated in such a way that the system may have difficulty accurately determining or measuring surfaces, edges, and vertices. Under reduced-confidence conditions, the system 100 may, for example, reduce the number of minimum confirmations required for an acceptable measure (e.g., from 3 to 2) or analyze additional frames per second (e.g., sacrificing operational speed for enhanced accuracy). The confidence condition level may be displayed to the user 104 and stored in the dataset corresponding to the target object 106.

The system 100 may monitor the onboard IMU (216, FIG. 2) of the mobile device 102 (e.g., or inertial/orientation sensors integrated into the 3D imager (204, FIG. 2) to detect difficulty in the identification of candidate surfaces, candidate edges, and candidate vertices corresponding to the target object 106. For example, the IMU 216 may detect excessive shifts in the orientation of the mobile device 102 as the user 104 moves the mobile device around and the system 100 attempts to lock into the parameters of the target object. Similarly, the IMU 216 may notice rotational movement by the user 104 around the target object 106 and take this movement into account in the generation of the 3D holographic model.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A mobile computing device capable of being held by a user, comprising:
 a three-dimensional (3D) imager configured to capture at least 3D imaging data associated with a target object positioned on a surface, the 3D imaging data comprising a sequence of frames, each frame associated with a plurality of points, each point associated with a depth value;
 one or more processors in communication with the 3D imager, the one or more processors configured to:
  identify within the plurality of points, based on the plurality of depth values:
   at least one origin point associated with a corner of the target object;
   at least one set of neighboring points within a radius of the origin point;
  identify, by sampling the set of neighboring points:
   a plurality of plane segments, each plane segment associated with a surface of the target object; and
   a plurality of edge segments, each edge segment corresponding to an edge of the target object and to an intersection of two adjacent plane segments;
  determine, for each edge segment, one or more edge distances associated with the corresponding edge of the target object by sampling one or more intervals across at least one adjacent plane segment; and
  determine at least one dimension of each associated edge of the target object based on the one or more edge distances;
 and
 at least one display operatively coupled to the one or more processors, the display configured to present to the user one or more of the 3D imaging data, the plurality of edge segments, and the determined dimensions of each associated edge of the target object.

2. The mobile computing device of claim 1, wherein the determined dimension is based on a median value of the one or more edge distances.

3. The mobile computing device of claim 1, wherein the one or more processors are configured to:
 identify, within each frame, at least one frame dataset associated with an orientation of the mobile computing device relative to the target object, each frame dataset comprising one or more of the at least one origin point, the at least one set of neighboring points, the plurality of plane segments, and the plurality of edge segments; and refine at least one of the one or more edge distances and the dimension based on a median value including the at least one frame dataset.

4. The mobile computing device of claim 1, further comprising:

at least one memory operatively coupled to the one or more processors, the memory configured for storing one or more reference objects, each reference object corresponding to a set of reference dimensions.

5. The mobile computing device of claim 4, wherein the one or more processors are configured to:

compile one or more of the determined dimensions and the 3D imaging data corresponding to the target object; and store the compilation corresponding to the target object in the at least one memory as a reference object.

6. The mobile computing device of claim 4, wherein the one or more processors are configured to determine the dimension by comparing the target object to at least one reference object.

7. The mobile computing device of claim 4, further comprising:

at least one camera configured to capture a two-dimensional (2D) image stream associated with the target object, the camera including at least one scanner configured to detect encoded information on the target object;

wherein the one or more processors are configured to:

associate the target object with at least one reference object based on the detected encoded information; and compare the set of determined dimensions corresponding to the target object and the set of reference dimensions corresponding to the associated reference box.

8. The mobile computing device of claim 7, wherein the one or more processors are configured to:

determine at least one difference between the set of determined dimensions and the set of reference dimensions; and direct the display to prompt the user when the determined difference exceeds a threshold level.

9. The mobile computing device of claim 1, wherein the one or more processors are further configured to identify, by sampling the subset of neighboring points, a surface plane corresponding to the surface, wherein the surface is selected from a floor and a wall.

10. The mobile computing device of claim 1, further comprising:

at least one distance sensor configured to determine at least one distance of the target object from the mobile computing device;

wherein the set of determined dimensions is based on the at least one distance.

11. The mobile computing device of claim 1, wherein the one or more processors are configured to refine the plurality of plane segments and the plurality of edge segments by iteratively:

determining at least one refined origin point based on an intersection of the plurality of plane segments;

identifying at least one set of refined neighboring points within the radius of the refined origin point; and identifying, by sampling the at least one set of refined neighboring points:

at least one plurality of refined plane segments; and at least one plurality of refined edge segments corresponding to an intersection of two adjacent refined plane segments.

12. A method for dimensioning an object, comprising:

obtaining, via a three-dimensional (3D) imager of a mobile computing device, a point cloud of a target object, the point cloud including a plurality of points;

determining, via the mobile computing device, an origin point of the target object from within the plurality of points;

determining at least three plane segments of the target object by iteratively:

acquiring a point segmentation by identifying a first subset of the plurality of points within a radius of the origin point;

determining at least three plane segments associated with the point segmentation; and determining at least three edge segments of the target object, each edge segment based on an intersection of two of the at least three plane segments;

measuring the at least three edge segments from the origin point along the at least three edge segments to determine a second subset of points, each point of the second subset having a depth value indicative of the target object;

determining one or more edge distances by traversing each of the at least three edge segments over at least one interval; and determining, via the mobile computing device, at least one dimension corresponding to an edge of the target object based on the one or more edge distances.

13. The method for dimensioning an object of claim 12, further comprising:

updating the origin point based on an intersection of the at least three edge segments.

14. The method for dimensioning an object of claim 12, further comprising:

updating at least one of the origin point and the radius based on based on the point segmentation of a previously obtained point cloud.

15. The method for dimensioning an object of claim 12, wherein at least one of acquiring a point segmentation by identifying a first subset of the plurality of points within a radius of the origin point and determining one or more edge distances by traversing each of the at least three edge segments over the at least one interval includes a nearest neighbors search.

16. The method for dimensioning an object of claim 12, wherein the radius is adjustable to a greater radius when the point segmentation does not include all points having a depth value indicative of the target object.

17. The method for dimensioning an object of claim 12, wherein the radius is adjustable to a smaller radius when the point segmentation includes one or more points having a depth value indicative of a floor or a background.

18. The method for dimensioning an object of claim 12, wherein determining at least three plane segments associated with the point segmentation includes:

iteratively determining the at least three plane segments associated with the point segmentation until at least one criterion is fulfilled, wherein the criterion is a number of iterations.

19. The method for dimensioning an object of claim 12, wherein the origin point of the object is initially determined based on a nearest depth value relative to the plurality of points.

20. The method for dimensioning an object of claim 12, wherein determining at least three edge segments of the target object, each edge segment based on an intersection of two of the at least three plane segments, includes:
 correcting for at least one divergence of the plurality of points from a determined edge segment.

\* \* \* \* \*